Oct. 21, 1969    F. W. BAYARD, JR    3,473,750
MACHINE FOR MANUFACTURING CAPACITORS
Filed April 3, 1967    13 Sheets-Sheet 1

Fig. I.

Inventor
F. W. Bayard Jr.
by Rines and Rines
Attorneys

Inventor
F. W. Bayard Jr.
by *Rines and Rines*
Attorneys

Inventor
F. W. Bayard Jr.
by
Attorneys

Inventor
F. W. Bayard Jr.
by [signature]
Attorneys

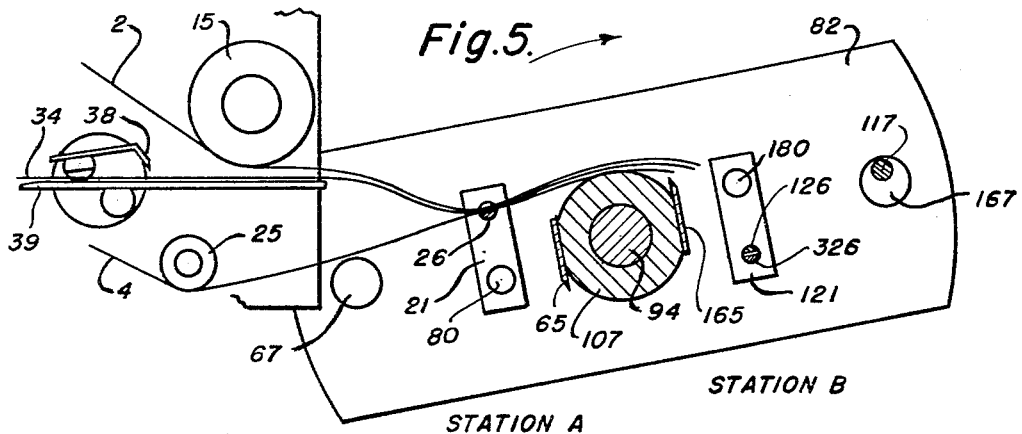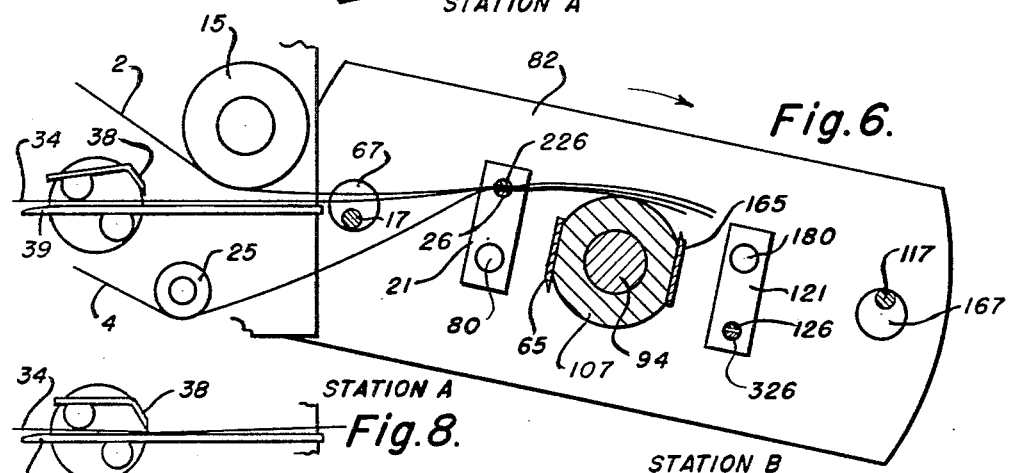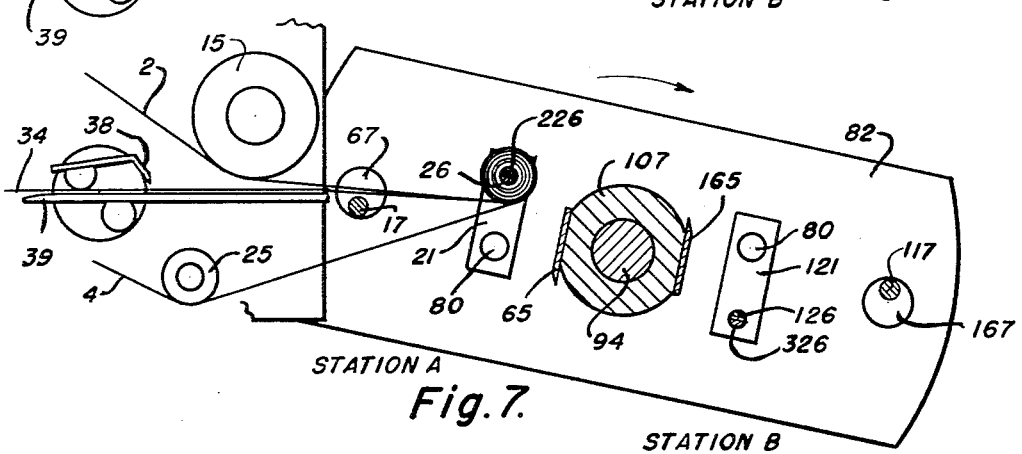

Inventor
F. W. Bayard Jr.
by
Attorneys

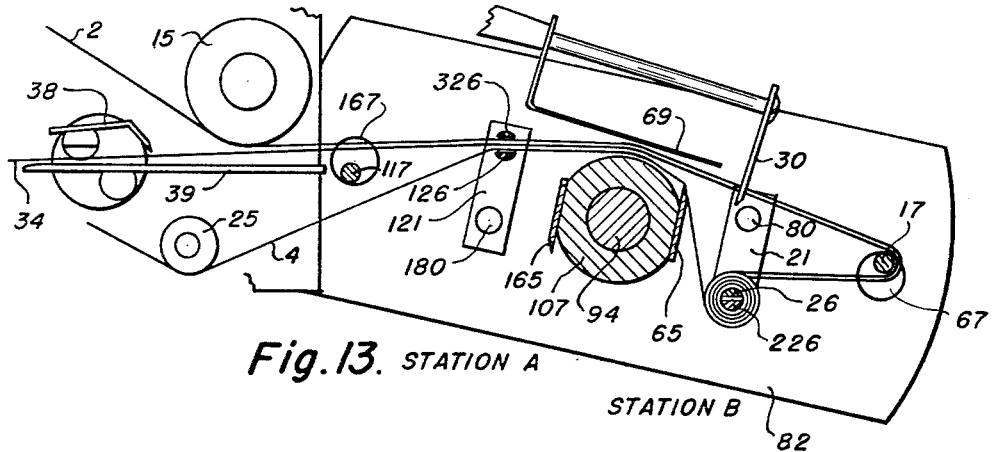
Fig. 13. STATION A / STATION B
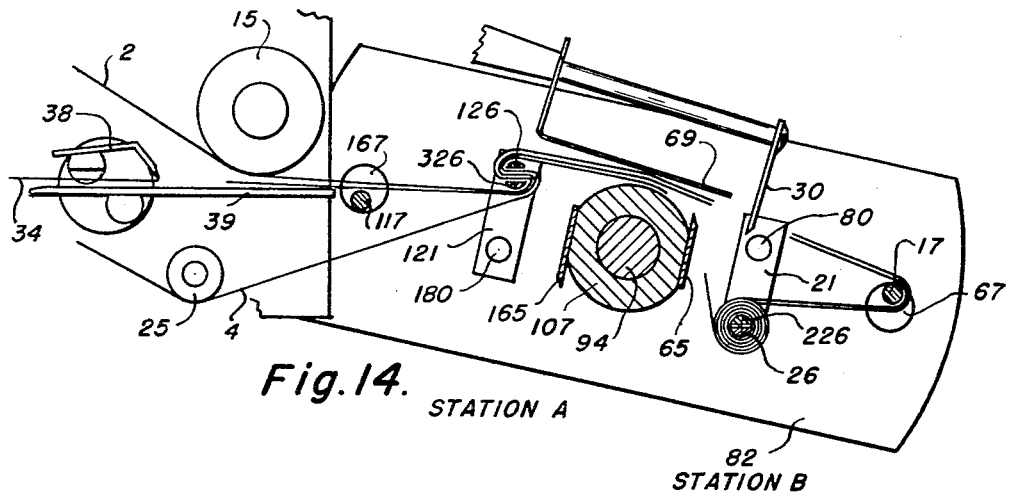
Fig. 14. STATION A / STATION B
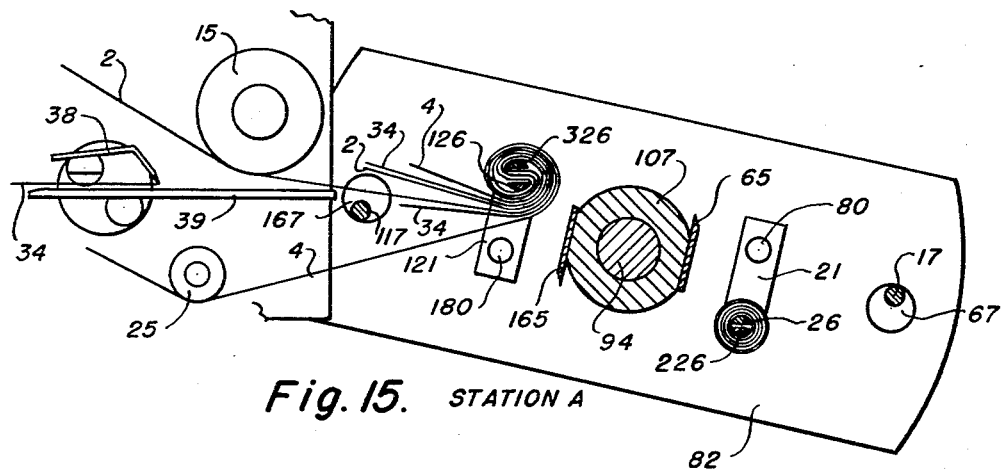
Fig. 15. STATION A / STATION B
Inventor
F. W. Bayard Jr.
by
Attorneys

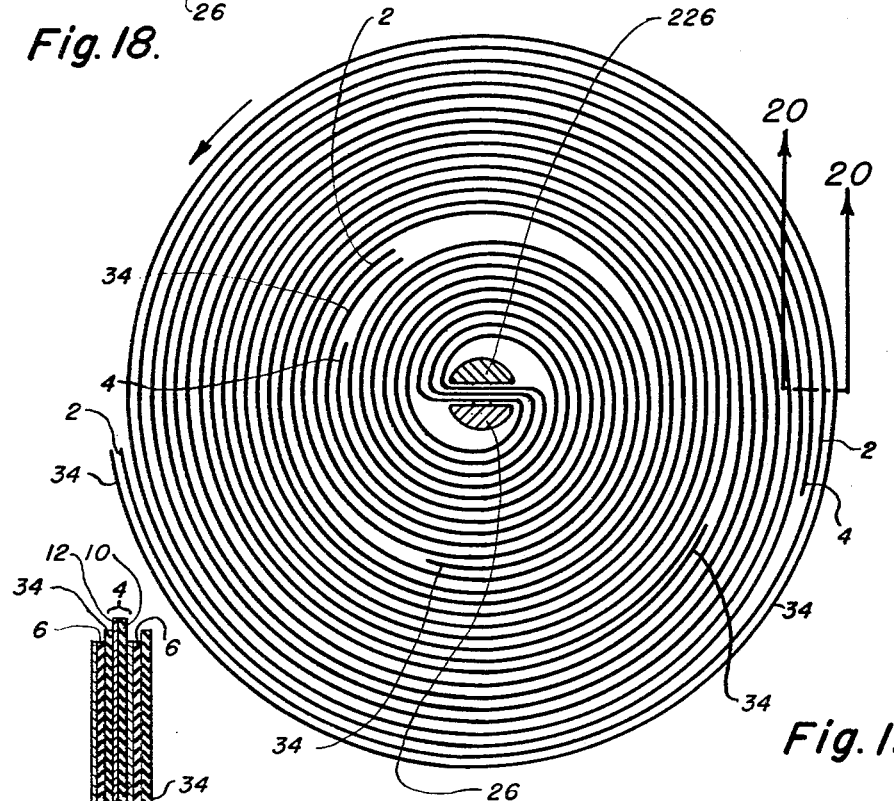

Oct. 21, 1969     F. W. BAYARD, JR     3,473,750
MACHINE FOR MANUFACTURING CAPACITORS
Filed April 3, 1967     13 Sheets-Sheet 9

Inventor
F. W. Bayard Jr.
by
Attorneys

Inventor
F. W. Bayard Jr.
by
Attorneys

Inventor
F. W. Bayard Jr.
by Rines and Rines
Attorneys

Oct. 21, 1969     F. W. BAYARD, JR     3,473,750
MACHINE FOR MANUFACTURING CAPACITORS

Filed April 3, 1967     13 Sheets-Sheet 12

Inventor
F. W. Bayard Jr.
by
Attorneys

Inventor
F. W. Bayard Jr.
by *[signature]*
Attorneys

United States Patent Office 3,473,750
Patented Oct. 21, 1969

3,473,750
MACHINE FOR MANUFACTURING CAPACITORS
Frank W. Bayard, Jr., Gansevoort, N.Y., assignor to H. H. Hilton Inc., Glens Falls, N.Y., a corporation
Filed Apr. 3, 1967, Ser. No. 627,811
Int. Cl. B65h 39/16; H01g 13/02
U.S. Cl. 242—56.1                                9 Claims

ABSTRACT OF THE DISCLOSURE

A machine for winding sheets of metallized dielectric material according to which a dielectric insulating sheet is introduced between the metallized sheets toward the end of the winding of each coil capacitor and the commencement of the winding of the next-succeeding coil capacitor for the purpose of preventing short-circuiting of the metal layers of the capacitor.

BACKGROUND OF THE INVENTION

Field of the invention

The invention is of the type in which the metallized sheets and the before-mentioned dielectric sheet between them are cut to separate each nearly completely wound capacitor from the next capacitor to be wound, whereby a part of the dielectric sheet remains at the end of the nearly completely wound coil capacitor and another part at the beginning of the next coil capacitor to be wound.

Description of the prior art

The present invention relates to methods of and machines for manufacturing coil capacitors, particularly capacitors of the type comprising superposed coiled dielectric sheets each metallized with a metal-foil layer on one only of its two surfaces, with the metal layer of each sheet disposed adjacent to the unmetallized surface of the other sheet.

According to one method of present-day practice, the capacitors are manufactured by winding the contacting sheets upon a rotating arbor and cutting the contacting sheets after the coil has been wound to a predetermined size. There is danger, however, of the cut raw edges of the metal-foil layers of the respective sheets meeting each other at the place where they are cut, and thus producing a short-circuit.

An object of the present invention, therefore, is to provide a new and improved machine for winding coil capacitors of the above-described character that shall avoid this danger.

Another object is to provide a new and improved machine of the above-described character that shall operate automatically, continuously, and without interruption.

Other and further objects will be explained hereinafter and will be particularly pointed out in the appended claims.

SUMMARY OF THE INVENTION

With the above objects in view, in accordance with the preferred embodiment of the invention that is herein illustrated and described, two superposed metallized sheets of the above-described character, with the metal layer of one of the sheets disposed adjacent to the unmetallized surface of the other sheet, are wound upon an arbor into a coil of predetermined size. Just prior to the coil attaining the predetermined size, an insulating sheet or strip is introduced between the metallized sheets. The insulating sheet is thus caused to straddle two successively manufactured capacitors, and it is later severed to provide two insulating patches between the metallized sheets, one at the end of a coil that has become nearly completely wound and the other at the commencement of the next coil to become wound. These patches serve to prevent the cut raw edges of the metal layers of the metallized sheets from meeting at the time of the severing, thereby protecting the capacitor coils against short-circuiting.

In order to render the operation continuous and automatic, two two-part arbors are provided, adapted interchangeably and successively to occupy first and second arbor Stations or Positions. The operation above described, up to the step of introducing the insulating sheet between the superposed metallized sheets, is performed at a time when each arbor occupies the first arbor Station or Position. The positions of the arbors are thereupon interchanged, with the result that so much of the coil as has become wound upon the arbor at the first arbor Station or Position, and the winding of which has become nearly completed, now assumes, with the arbor upon which it has become wound, the second arbor Station or Position. The interchanging of positions of the two two-part arbors, together with turrets upon which they are mounted, is described as indexing. The two-part arbor that has become actuated to the second arbor Station continues its rotation until the coil that has previously become wound thereon attains the predetermined size. Just prior to the coil attaining the predetermined size, however, the above-described severing operation is performed, at the second arbor Station. The severing operation is performed in two steps. The first step consists of severing, at a first predetermined severing point, the insulating sheet and one only of the metallized sheets, both of which, in contact with each other, have become separated from the other metallized sheet during the indexing operation. The second step, performed at a second predetermined severing point slightly to the rear of the first predetermined severing point, consists of severing the said other metallized sheet. In this manner, it becomes provided that the said one of the said metallized sheets, and also the insulating sheet in contact therewith, shall become slightly longer than the said other metallized sheet, with rear trailing ends. The extra lengths thus provided are utilized for two purposes: to seal the capacitor and to provide a wrapper therefor. During the indexing operation, the two parts of the two-part arbor separate, releasing the completed capacitor wound thereon, permitting it to fall, by gravity, into a receptacle therebeneath.

BRIEF DESCRIPTION OF THE DRAWINGS

The invention will now be more particularly described in connection with the accompanying drawings, in which

FIGS. 5 to 7, inclusive, are diagrammatic views of the right-hand portion of the machine as shown in FIG. 4, but depicting steps of the operating cycle of winding a capacitor prior to the step illustrated by FIG. 4;

FIG. 8 is a view of the Mylar cutter shown in FIGS. 1, 2 and 4 to 7, inclusive, but shown occupying its cutting position;

FIGS. 13–15, inclusive, are views similar to FIGS. 5 to 7 and 9, but depicting steps of the operating cycle subsequent to the step illustrated by FIG. 4;

FIG. 16 is a diagrammatic perspective, upon a larger scale than in FIGS. 4–9 and 13–15, inclusive, representing two metallized sheets, with a dielectric insulating sheet interposed, resting on the lower part of a two-part arbor, at the first Station or Position A, at the commencement of the operating cycle of winding a capacitor;

FIG. 17 is a similar view, showing the upper part of the two-part arbor superposed over the lower part, with the said sheets interposed therebetween;

FIG. 18 is a section, upon a still larger scale, taken upon the line 18—18 of FIG. 17, looking in the direction of the arrows;

FIG. 19 is a diagrammatic view, upon a greatly exaggerated scale, illustrative of the nature of the convolution of a capacitor manufactured by the machine and according to the method of the present invention;

FIG. 20 is a section, but upon a larger scale, taken upon the line 20—20 of FIG. 19, looking in the direction of the arrows;

DESCRIPTION OF THE PREFERRED EMBODIMENT OF THE INVENTION

Figure 1:
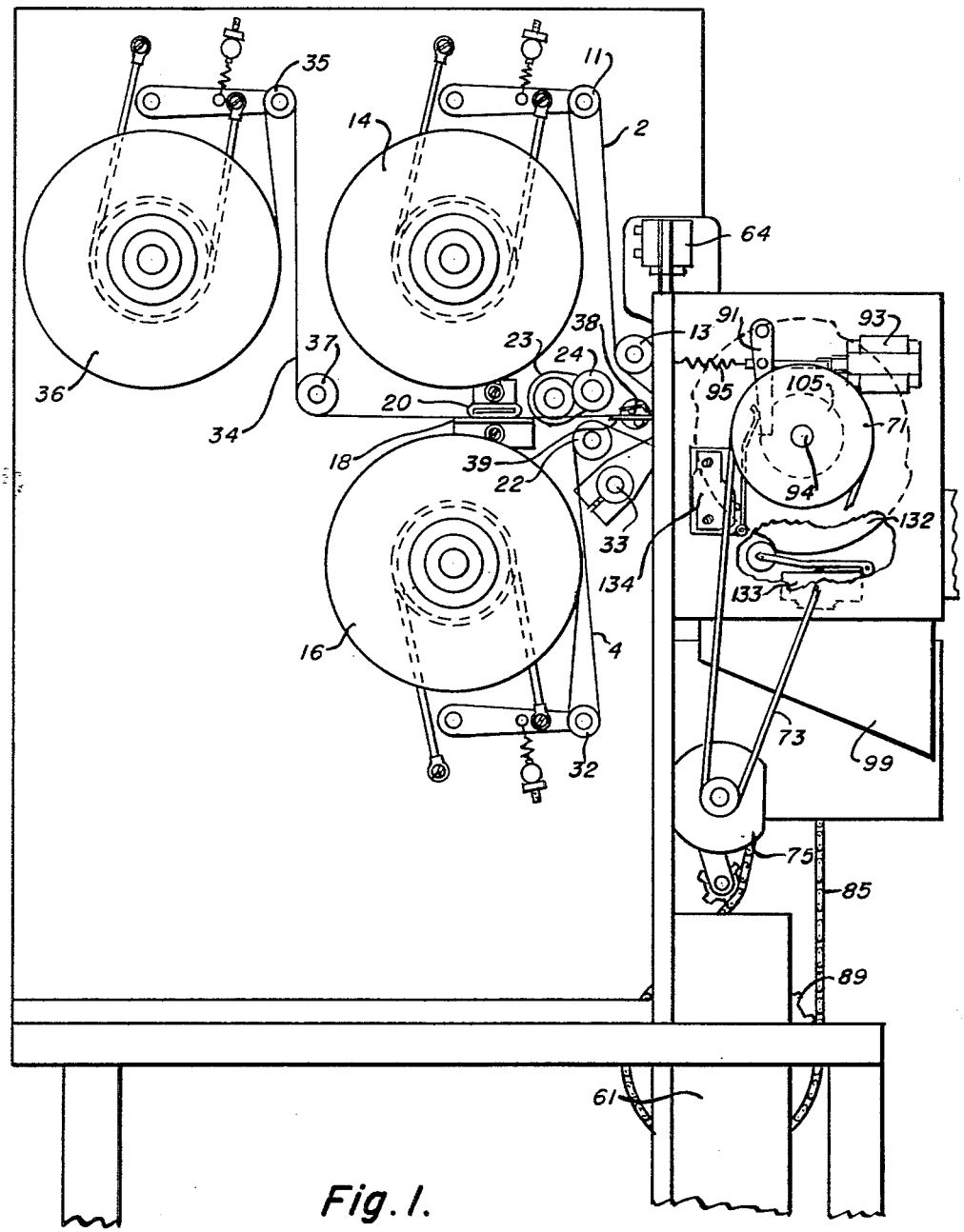
FIG. 1 is a front elevation, with a part broken away, of a machine embodying the present invention, is preferred form.

The electrolytic capacitor that is manufactured by the machine of the present invention is illustrated as of the type that is formed by winding or coiling superposed metallized sheets of the kind illustrated by the sections of FIGS. 10 to 12, 18 and 20, which show upper and lower two such sheets 2 and 4, in contact with each other; though the capacitor produced by the machine of the present invention differs in that an insulating path is interposed between the metallized sheets at the start and finish of each coil capacitor. The sheet 2, as shown more particularly in FIG. 11, may be constituted of, for example, a suitable insulating, non-conductive or dielectric plastic base 6, say, of polystyrene, polyethylene, polyethylene terephthalate, known commercially as Mylar, having a metal layer 8, say, of anoidized or formed metal, such as aluminum or tantalum, on one surface only thereof; and the sheet 4, as shown more particularly in FIG. 10, may be constituted similarly of a similar non-conductive or dielectric base 10, with a similar anodized or formed metal layer 12 on one surface only thereof. The metal layers 8 and 12 are illustrated as deposited on corresponding upper surfaces of the non-conducting bases 6 and 10, in order that, after the sheets 2 and 4 have become rolled or wound together in superposed contacting relation to constitute a capacitor, the metal layers 8 and 12 thereof shall be separated from each other by the unmetallized non-conductive Mylar bases 6 and 10, with the metallized layer 8 or 12 of each sheet 2 or 4 disposed adjacent to the unmetallized dielectric surface 10 or 6, respectively, of the other sheet 4 or 2. The metal layers 8 and 12 may be deposited on their respective bases 6 and 10 in any well-known way, as by vaporizing in a vacuum and condensing the vapor.

Figure 2:
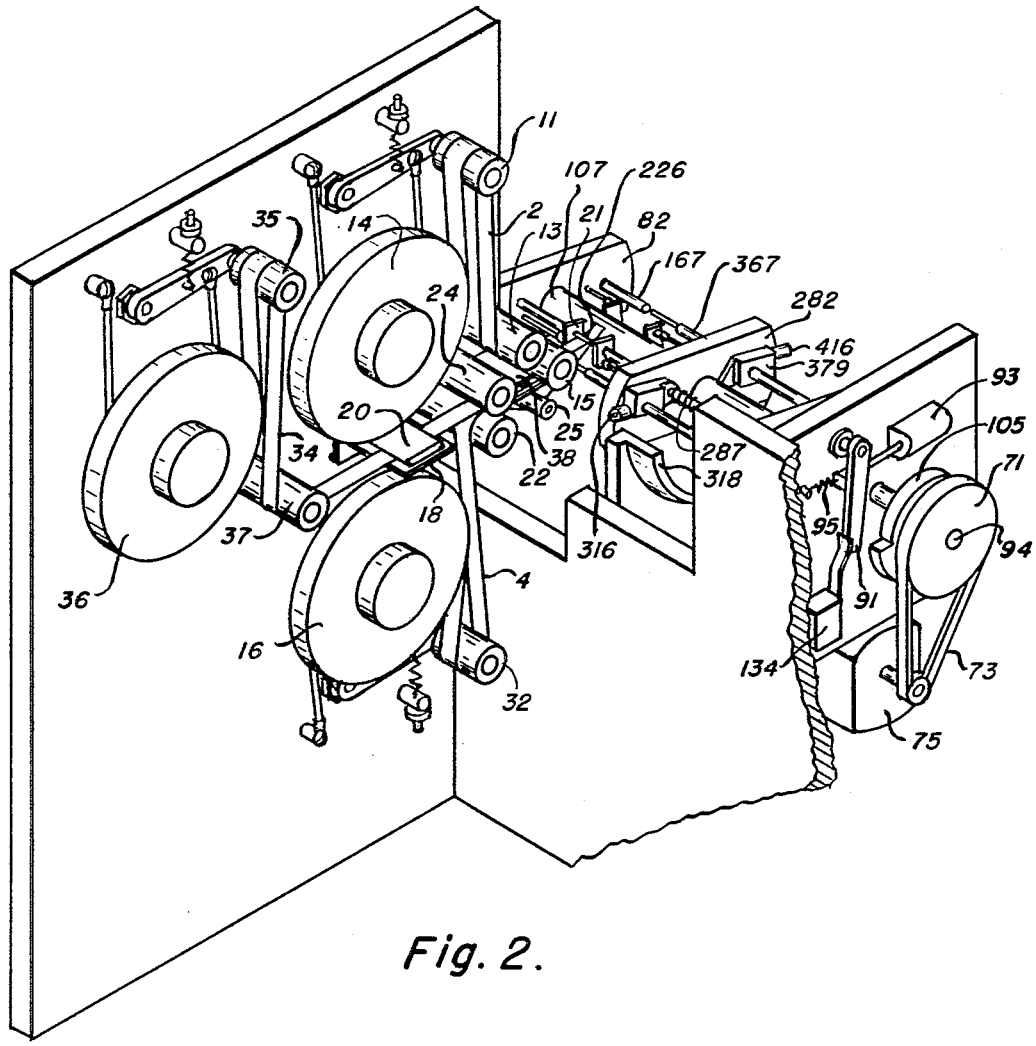
FIG. 2 is a fragmentary isometric view of the same.

The metallized sheets 2 and 4 are fed from respective tension-control supply rolls or spindles 14 and 16, shown in FIGS. 1 and 2, with the metal surfaces 8 and 12 thereof uppermost.

The upper metallized sheet 2 is shown initially brought up from its supply roll 14, over a tension-control idler roll 11, then down over an idler roll 13, and thence to an eccentric idler roll 15, shown also in FIGS. 4 to 7 and 13 to 15, inclusive. From the eccentric idler roll 15, as illustrated more particularly in FIGS. 6 and 7, the upper metallized sheet 2 is fed forward, in the line of feed, with its metal layer 8 uppermost, over or above a threader bar 17, to a split or two-part arbor. The lower part of the two-part arbor is designated in these FIGS. 6 and 7 at 26, and the upper part at 226. The lower arbor part 26 and the threader bar 17 are shown mounted on a turret 82, that is fixed to a sleeve 107, which is mounted to rotate freely axially about an arbor drive shaft 94.

Figure 4:
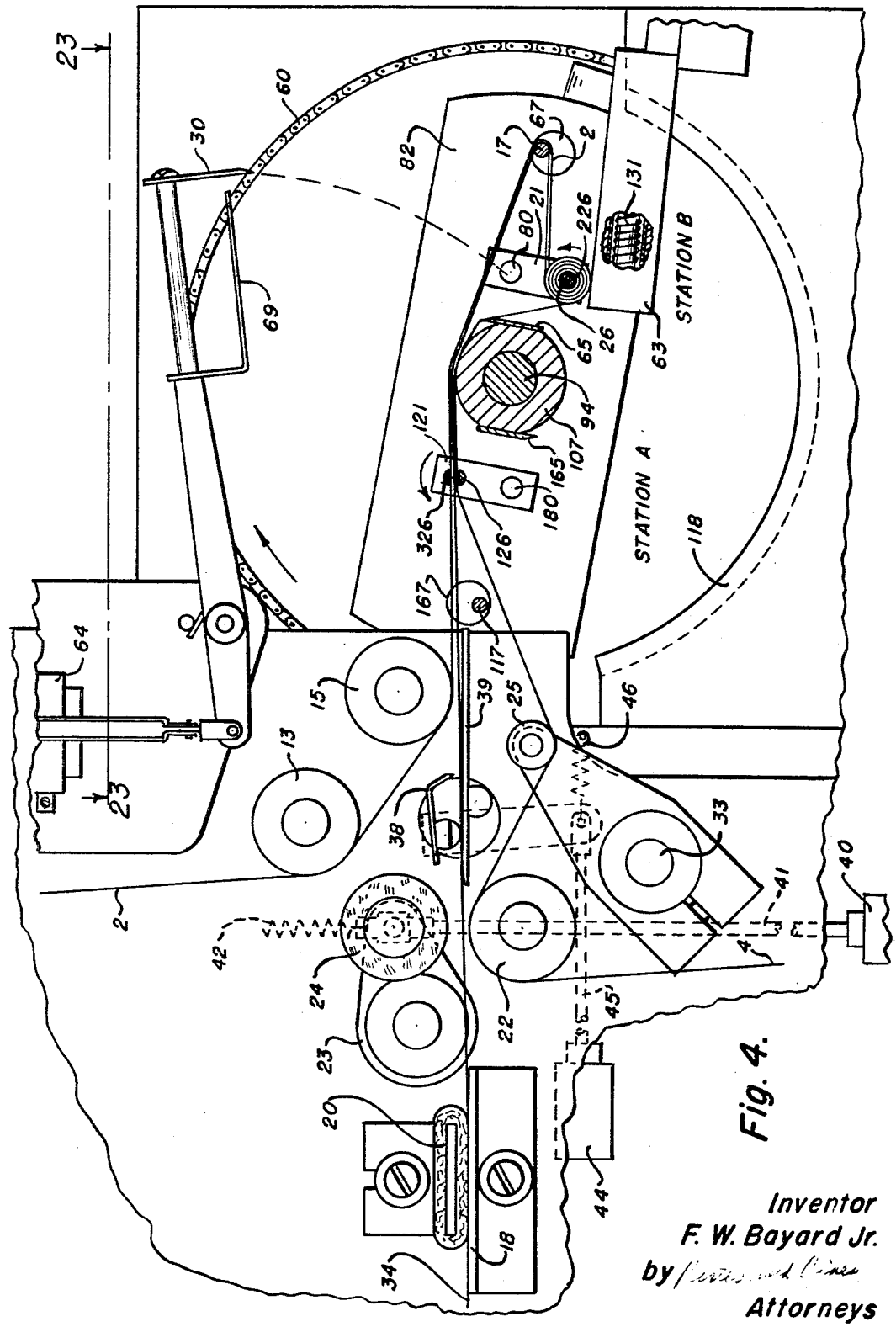
FIG. 4 is a front elevation of the right-hand portion of the machine as shown in FIGS. 1 and 2, but upon a larger scale, and partly in section upon the line 4—4 of FIG. 23, looking in the direction of the arrows.

The lower metallized sheet 4 is similarly initially brought down from its supply roll 16, FIGS. 1 and 2, up over a tension control idler roll 32, then up over an idler roll 22, and thence under a smaller idler roll 25, which, as shown more particularly in FIG. 4, is adjustable about a pivot 33. From the adjustable idler roll 25, the lower metallized sheet 4 is fed forward, in the line of feed, with its metal layer 12 uppermost and in contact with the unmetallized surface of the base 6 of the metallized sheet 2 superposed thereover, under or below the threader bar 17, as illustrated more particularly in FIGS. 6 and 7, to the same two-part arbor 26, 226.

The manner in which the two metallized sheets 2 and 4 are thus fed to the two-part arbor 26, 226, with the metal layer 12 of the metallized sheet 4 in contact with the unmetallized surface of the base 6 of the metallized sheet 2 superposed thereover, is clearly shown in FIG. 18, except that an insulating or non-conductive Mylar sheet or strip 34, is shown in FIG. 18 interposed intermediate the metallized sheets. How this non-conductive sheet 34 becomes thus interposed will be explained hereinafter. For the present, it should be stated that the major part of the winding of the capacitor is manufactured without this unmetallized sheet 34 interposed, this interposition occurring at the beginnings and the ends of the capacitor coils only, for a purpose hereinafter more fully described.

The two-part arbor 26, 226 is shown more particularly in FIG. 6 at the commencement of the winding of a capacitor. It at this time occupies what may be described as a first arbor Position or Station A. At a later time, this two-part arbor 26, 226 will occupy, instead, a second arbor Position or Station B. At the time that it occupies Station A. however, another two-part arbor 126, 326 occupies the position at Station B. The lower parts of the two two-part arbors 26, 226 and 126, 326 are thus positioned at opposite ends of the turret 82, in order that they may interchangeably and successively occupy these two positions at Stations A and B upon the turret 82 becoming rotated or indexed, with its sleeve 107, about the arbor drive shaft 94, through an 180 degree rotation. As will be described more fully hereinafter, the upper parts of these two-part arbors rotate through the 180° with the lower parts thereof.

For the present, however, the description will proceed with the two-part arbor 26, 226 assumed initially to occupy its initial position at Station A, as represented by FIG. 6.

Initially, just prior to the commencement of a cycle of operation of winding a capacitor, the lower part 26 of the two-part arbor 26, 226, as shown in FIGS. 5 and 16, is alone positioned in the line of feed, or loading position, the upper part 226 being at this time retracted, out of the line of feed. Initially, therefore, the forward or leading ends of the metallized sheets 2 and 4 are fed over this lower part 26 alone of the two-part arbor 26, 226. As already stated, the insulating Mylar sheet 34 is at this time interposed between the metallized sheets 2 and 4. To start with, at the beginning of the winding operation, this may be effected manually by pulling the metallized sheets 2 and 4 from their respective supply rolls 14 and 16, and the insulating sheet 34 from its supply roll 36. Thereafter, however, as more fully described hereinafter, the operation is continuous and automatic.

After the metallized sheets 2 and 4 and the insulating sheet 34 have initially become deposited manually, as above described, upon the lower part 26 of the two-part arbor 26, 226, at the Station A, as illustrated by FIG. 16, the upper part 226 of this arbor, by mechanism more fully described hereinafter, becomes actuated out of its retracted position, and into the line of feed, directly over the lower arbor part 26 and the metallized sheets 2 and 4 and the insulating sheet 34 deposited thereon. This is illustrated by FIG. 17. The forward or leading ends of the metallized sheets 2 and 4 and the insulating sheet 34 become thus engaged and clamped between the two parts 26 and 226 of the two-part arbor 26, 226. At this time a Mylar cutter 38, FIG. 8, is actuated to cut an insulating patch from the Mylar sheet 34.

The two-part arbor 26, 226 is now set rotating at the Station A, which results in winding or coiling the metallized sheets 2 and 4, with the insulating patch 34, around it, pulling them from their respective supply rolls 14, 16 and 36. It is by means of this pulling action that the metallized sheets 2 and 4 and the Mylar sheet 34 are fed from their respective supply rolls 14, 16 and 36.

The machine is adjustable to cause the arbor 26, 226 to wind coils of different predetermined size. Just prior to the time that the predetermined size, toward the end of the completion of each winding cycle, has become wound upon the arbor 26, 226, however, the before-mentioned insulating or non-conductive Mylar sheet 34 is introduced between or intermediate the metallized sheets 2 and 4, on the arbor 26, 226. This sheet 34 may be constituted of the same Mylar as that of the Mylar bases 6 and 10 of the metallized sheets 2 and 4, except that it is unmetallized or plain. This unmetallized or plain insulating Mylar sheet 34 may be brought up from a supply roll 36, FIGS. 1 and 2, over a tension control idler roller 35, and under an idler roll 37, between a lower platform 18 and an upper felt or other soft low-tension pliable foot 20, illustrated also in FIG. 4. The degree of tension that is thus produced upon the Mylar sheet 34 by the felt foot 20 pressing it against the platform 18, though not very great, is sufficient to prevent the Mylar sheet 34 sagging just to the left of the platform 18 and the foot 20. To the right of the platform 18 and the foot 20, the plain Mylar sheet 34 is fed, over the before-mentioned idler roller 22, to a platform 39, shown more particularly in FIG. 4, of phenolic or like material. These elements are all illustrated as positioned to the rear of the arbor 26, 226, in the line of feed. From the platform 39, therefore, the plain Mylar sheet 34 is initially fed forward over the threader bar 17, as illustrated more particularly by FIG. 6, and into the partly wound coil, in between the metallized sheets 2 and 4 that have become partly wound on the arbor 26, 226. Thereafter, therefore, the unmetallized Mylar sheet 34 becomes wound about the arbor 26, 226 in between and in contact with the metallized sheets 2 and 4, as illustrated by FIG. 18.

This feeding of the Mylar sheet 34 in between and in contact with the metallized sheets 2 and 4 on the arbor 26, 226 is effected intermittently only, at a predetermined time in the cycle of operation and by the following mechanism. Referring to FIGS. 1, 2 and 4, at a position to the right of the pliable foot 20 and the platform 18, and to the left of the platform 39, in the line of feed, directly above the idler roller 22, upon a freely pivotally mounted arm 23, there is pivoted a friction pinch roller 24, constituted of cork or other suitable resilient material. At predetermined times, toward the end of the completion of each winding cycle, just prior to the completion of the winding of a coil of the desired predetermined size, at the Station A, this pinch roll 24 is pulled downward by a solenoid 40, that is connected to the pivoted arm 23 by a rod 41. The solenoid 40, like other mechanisms herein described, is under the control of a timer 61, shown in FIGS. 1, 3 and 26, of well-known construction. One such timer, for example, is the Multiplex Timer "HM" Series, described in Bulletins 130C, November 1964, and 130E, September 1961, of Bliss Eagle Signal, a division of the E. W. Bliss Company, 738 Federal St., Davenport, Iowa 52803.

This downward actuation of the pinch roll 24 results in pressing it against the portion of the unmetallized Mylar sheet 34 that happens to be superposed over the lower metallized sheet 4 on the idler roller 22. Since the lower metallized sheet 4 is pulled forward, as before described, by the pulling action of the arbor 26, 226, and since this idler roll 22 becomes accordingly rotated thereby, it is in this manner that, at the predetermined times beforementioned, the unmetallized Mylar sheet 34 becomes fed forward, over the phenolic platform 39, and in between and in contact with the metallized sheets 2 and 4, wound upon the arbor 26, 226 at the Station A. In between these predetermined times of downward operation of the pinch roller 24, however, the pinch roller 24 becomes retracted, out of engagement with the Mylar sheet 34 therebeneath, by a return coil spring 42, which causes the arm 23, on which the pinch roll 24 is pivotally mounted, to become pivoted upward.

The insulating Mylar sheet 34 becomes introduced into the partly wound coil on the two-part arbor 26, 226, between the metallized sheets 2 and 4, at the Station A, as before stated, at nearly the end of the cycle of winding of the coil. The superposed metallized sheets 2 and 4, with the insulating sheet 34 interposed between and in contact with them, on the arbor 26, 226, become thereupon rotated around the arbor 26, 226 a small number of additional revolutions. Thereupon, and still before the predetermined size of coil has become wound upon the arbor 26, 226, at the Station A, the arbors 26, 226 and 126, 326 are caused to interchange their positions at the Stations A and B. The description of this interchange or indexing operation will be made with particular reference to FIGS. 4 to 9, inclusive, and 13 to 15, inclusive.

The winding of the capacitor coil on the two-part arbor 26, 226, when occupying its Station A position, may be assumed to be commenced when the turret 82 occupies the position represented by FIG. 6. Cutter 38, FIG. 8, has become actuated to sever a patch from the Mylar sheet 34.

The turret 82 remains in this position, with the two-part arbor 26, 226 rotating, at the Station A, until just before the desired predetermined length of the metallized sheets 2 and 4 has become wound thereon to produce a capacitor coil of the predetermined size. This is the condition that is illustrated by FIG. 7. Thereupon, and still before the coil of predetermined size has become quite completely wound upon the two-part arbor 26, 226, at the Station A, the forward or leading end of the Mylar sheet 34 becomes interposed, as above described, between and in contact with the metallized sheets 2 and 4 on the arbor 26, 226. The turret 82 now becomes rotated, through the position illustrated by FIG. 9, to a position 180 degrees away from its original position, which is illustrated by FIG. 4. As already stated, this 180-degree rotation of the turret 82, with the two two-part arbors 26, 226 and 126, 326, carried thereby, is known in the art as indexing. At the end of this 180-degree indexing operation of the turret 82, the arbors 26, 226 and 126, 326 have interchanged their positions at the Stations A and B.

In FIG. 4, the two-part arbor 126, 326, which had previously been positioned at Station B, is shown as now occupying a position at the Station A, the position that had previously been occupied by the arbor 26, 226. The operation described above with respect to the arbor 26, 226, at the Station A, will now be repeated at the Station A, with respect to the arbor 126, 326.

The coil that has become transported, during the indexing, from the Station A to the Station B, has not, however, become quite completed. It becomes completed at the Station B. Further operations will be performed at the Station B, upon the nearly completed coil or winding that has become transported, on the arbor 26, 226 from the Station A to the Station B, for the purpose of completing the cycle of its manufacture into a complete capacitor.

Figure 9:
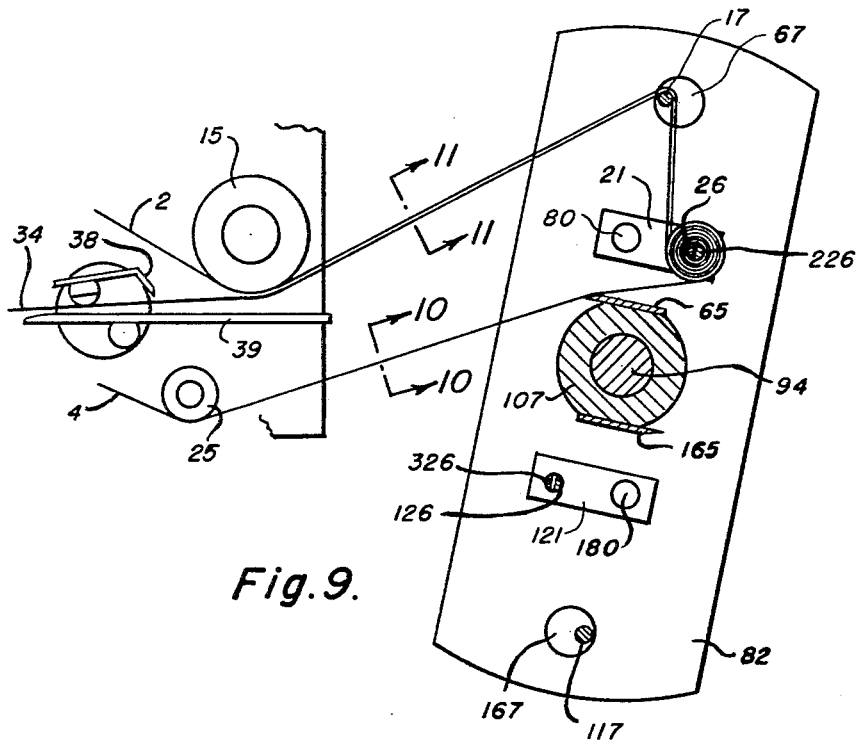
FIG. 9 is a view similar to FIGS. 5 to 7, inclusive, but depicting a step of the operating cycle intermediate between the steps illustrated by FIGS. 7 and 4.
Figures 10, 11:
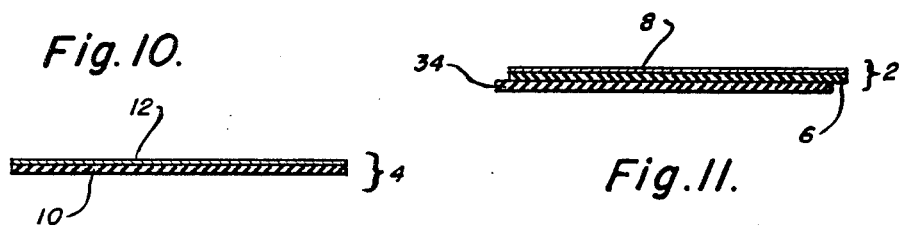
FIGS. 10 and 11 are sections, upon an exaggerated scale, taken upon the lines 10—10 and 11—11, respectively of FIG. 9.

To understand these further operations, it should first be noted that, during the interchange of positions of the arbors between the Stations A and B, the arbor 26, 226, in assuming its position at Station B, as illustrated by FIG. 4, has carried with it as much of the metallized sheets 2 and 4 as have become up to that time wound thereon, at the Station A, and also as much of the unmetallized Mylar sheet 34 as has become interposed between and in contact with the metallized sheets 2 and 4, on the arbor 26, 226. It should be noted also that, during the interchange of positions of the arbors between the Stations A and B, the threader bar 17 has engaged the under surface of the Mylar sheet 34, as illustrated by FIG. 9, to separate it, together with the upper metallized sheet 2 superposed thereover and in contact therewith, from the lower metallized sheet 4. It should be noted further that the two-part arbor 26, 226 has also pulled, from the Station A to the Station B, a considerable length of the superposed metallized sheets 2 and 4 and of the interposed unmetallized Mylar sheet 34. This is of length sufficient to straddle or span the end of the coil that has become nearly completely wound on the arbor 26, 226, at the Station A, to the right, or forward, of the turret cutter 30, and the beginning of the winding of the next-succeeding coil that is about to be commenced to be wound on the arbor 126, 326 at the Station A, to the left or rearward of the turret cutter 30.

The Mylar sheet 34 is not, however, wound into the capacitor, along with the metallized sheets 2 and 4, throughout the complete winding operation of the capacitor. Insulating patches are formed at the ends only of the capacitor, where, in its absence, there would be danger of contact between the metal layers of the metallized sheets 2 and 4. Shortly after a short piece of the Mylar sheet 34 has become wound in with the metallized sheets 2 and 4, around the two-part arbor 26, 226, at the Station A, the Mylar cutter knife 38 is caused to descend toward the platform 39, as shown in FIG. 8, to sever the rear Mylar patch from the Mylar insulating sheet 34, to the rear thereof, in the line of feed.

The actuation of the pinch roll 24 and of the Mylar cutter 38 against the platform 39 is effected, in timed relation with the other operations before described, under the control, by the timer 61, of a solenoid 44, shown more particularly in FIG. 4, to which the cutter 39 is mechanically connected, as shown at 45. Upon the de-energization of the solenoid 44, the cutter 38 becomes returned to its effective position by a coil spring 46.

In this manner, only a limited length of the non-conductive Mylar sheet 34 is fed forward between the metallized sheets 2 and 4, sufficiently long, however, to span the distance between the two-part arbors 26, 226 and 126, 326 at the Stations A and B. Sufficient short length insulating patches become thus interposed between the metallized sheets 2 and 4 at the beginning and the end of each finished or completed capacitor coil. The operation is such that a forward patch of the Mylar sheet 34 becomes introduced in between the metallized sheets 2 and 4 at the end of the winding of one capacitor at the Station B, and a rear patch of this Mylar sheet 34 becomes introduced between the metallized sheets 2 and 4 at the commencement of the winding of a new capacitor at the Station A.

Figure 21:
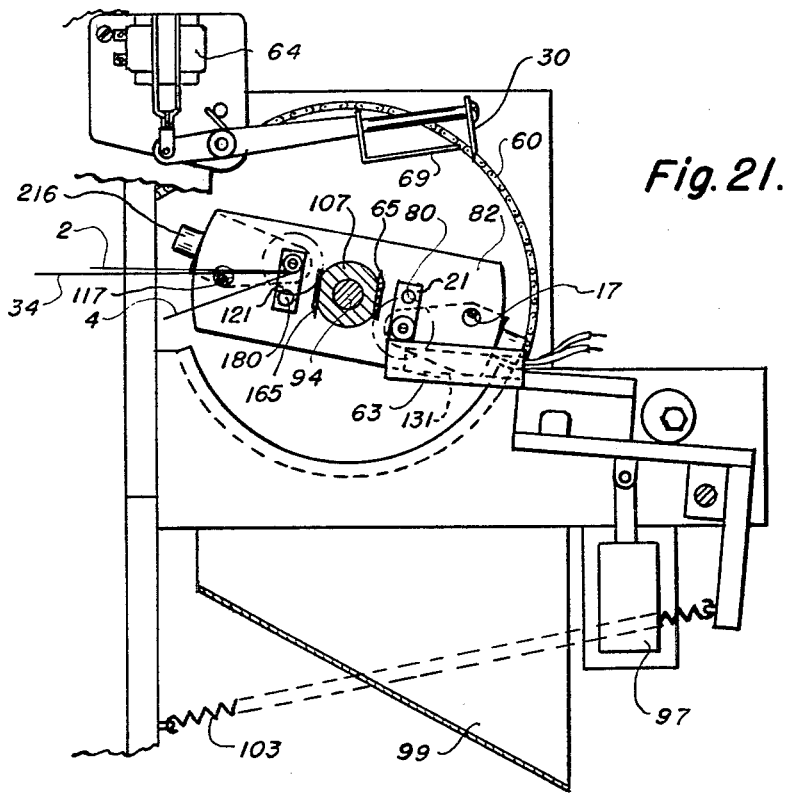
FIG. 21 is a view of the right-hand portion of the machine as viewed in FIG. 4, with the parts occupying the positions shown in FIG. 4, but upon a smaller scale, and showing additional mechanisms.

FIG. 5 shows the position of the turret 82 at a moment just before it has quite completed its 180-degree indexing operation, and at a moment when the two two-part arbors 26–226 and 126–326 have not yet quite completed their interchange of positions between the Stations A and B. This is at a moment just prior to the commencement of a winding cycle. It may be considered to represent the parts of the machine at the moment when the machine is started, and the metallized sheets 2 and 4, with the insulating sheet 34 interposed, are laid over the part arbor 26 by hand; and it represents also the commencement of any subsequent winding cycle. FIG. 6 shows the relative positions of these parts at the moment of the commencement of a winding cycle; and FIG. 7 shows the relative positions of these parts at a somewhat later time. FIG. 13 shows the lower and upper arbor parts 26 and 226 of the two-part arbor 26, 226 in the center of the nearly completed capacitor coil at the Station B. The turret 82 has just indexed and a heat-seal block 63, more fully referred to hereinafter, is applied thereto, as shown in FIG. 21, though omitted from FIG. 13. A turret cutter 30 has just severed both the metallized sheet 2 and the Mylar sheet 34 in contact therewith. One or two turns of this Mylar sheet have previously become wound in between the metallized sheets 2 and 4, at the stage of the operation represented by FIG. 13. At this time the lower metallized sheet 4 has not yet become severed by the hereinafter more fully described shaft cutter 65. It becomes severed, as shown in FIG. 14, slightly thereafter when the arbors start rotating from the next winding cycle, which tightens the metallized sheet 4 over the shaft cutter 65.

The raw edges of the metallized sheets 2 and 4 are protected, not only by the Mylar patches before described, but also by the fact that the threader bar 17, as shown in FIG. 9, introduces in between the superposed contacting sheets 2 and 34 a short length of between ¼ inch and ½ inch additional to the corresponding length of the lower metallized sheet 4. This additional short length aids the function of the forward Mylar patch in preventing the rear raw edges of the completed capacitor coil coming into contact with each other.

At the end of the 180-degree indexing operation, the unmetallized Mylar sheet 34 and the upper metallized sheet 2 superposed over and in contact therewith will become cut by the turret cutter 30, as shown in FIGS. 4, 13 and 14. And, as also shown by these FIGS. 4, 13 and 14, the lower metallized sheet 4 also becomes separately severed by a cutter 65, fixed to the sleeve 107.

Since the cutters 30 and 65 never cut the metallized sheets 2 and 4 except when the indulating sheet 34 is interposed therebetween, therefore, the operation of these cutters can never produce short-circuiting of the capacitor.

FIG. 4 shows the relative positions of the parts just prior to the severing of the Mylar sheet 34 by the turret cutter 30. FIG. 13 shows the cutting of the superposed upper metallized sheet 2 and the Mylar sheet 34 in contact therewith.

The cutting operations of the cutters 30 and 65 are shown in FIGS. 13 and 14 as effected merely by their impinging against the upper metallized sheet 2 and the Mylar sheet 34 contacting therewith, and the lower metallized sheet 4, respectively. No cutting blocks for these cutters are needed, because sufficient convolutions have become wound upon the arbor 26, 226, at the Station B, to prevent unrolling so much of the coil as has become wound thereon. A resilient spring 69, however, which is shown in FIGS. 4 and 21, fixed to the arm that carries the cutter 30, so as to be movable therewith, presses the sheets 2, 34 and 4, at this time, focibly against the sleeve 107, to prevent slipping during the cutting by the cutter 30. In FIG. 14, the sheet 4 is shown cut by the cutter 65; and, in FIG. 15, a further step is shown, as a result of which the capacitor has become completely wound on the arbor 26, 226, at the Station B, and a new capacitor has begun to become wound at the Station A. The steps of the operation are shown successively in FIGS. 5, 6, 7, 9, 4, and 13 to 15, inclusive.

With respect to the new capacitor that is to become wound on the arbor 126, 326, at the Station A, the cutting operation of the turret cutter 30 has resulted in the Mylar sheet 34, that has been interposed between the metallized sheets 2 and 4, becoming cut into approximately two equal parts. These two parts, which may respectively be referred to as forward and rear insulating patches, have become incorporated into the two successively wound capacitors before-mentioned, respectively at the end and at the commencement of the operations of their winding cycles at the respective Stations B and A. The forward insulating patch separates the raw cut edges of the two metallized sheets 2 and 4 at the rear end of the capacitor that has become completely wound upon the two-part arbor 26, 226 at the Station B; and the rear insulating patch separates the cut edges of the two metallized sheets 2 and 4 at the forward end of the next capacitor that is about to become wound on the two-part arbor 126, 326, at the Station A.

As a result of the separation, by the threader bar 17, of the Mylar sheet 34 and the upper metallized sheet 2 in contact therewith from the lower metallized sheet 4, as illustrated by FIGS. 9 and 4, and as is further evident from FIGS. 4, 13 and 14, the rear ends of the upper metallized sheet 2 and the Mylar sheet patch in contact therewith are thereby caused to extend or trail rearward of the corresponding rear end of the lower metallized sheet 4. The difference in the lengths of the cuts at the arbor thus effected by the cutters 30 and 65, as already stated, is between ¼ and ½ inch.

The rotation of the two-part arbor 26, 226 is interrupted during its transfer from the Station A to the Station B. It becomes resumed, however, at the Station B, to effect a small number of additional convolutions to complete the winding of the capacitor coil. During this operation of completing the winding of the capacitor coil on the arbor 26, 226, at the Station B, the longer rear trailing ends of the upper metallized sheet 2, and the forward Mylar-sheet patch in contact therewith, together become the final terminal convolutions of the coil on the arbor 26, 226, at the Station B, constituting a wrapper for the completed capacitor.

Figure 12:
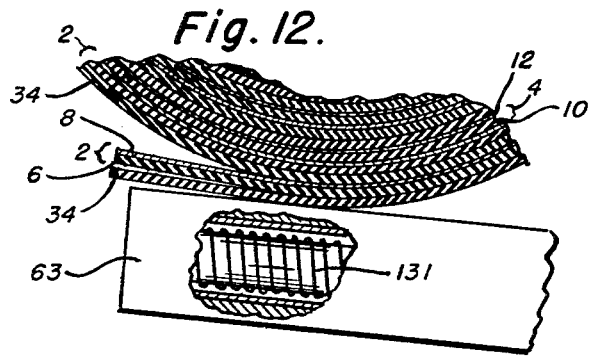
FIG. 12 is a diagrammatic representation, upon the same exaggerated scale, illustrating the step of sealing the completed capacitor.

In cases where the insulating sheet 34 is constituted of a suitable plastic, like Mylar, this wrapper end of the Mylar sheet 34 may become heat-sealed by means of pressure and the before-mentioned heat-sealing unit 63, illustrated diagrammatically in FIGS. 4, 12 and 21. The heat-sealing unit 63 is provided with a heating coil 131. Under the force of a spring 163, the heat seal 63 is applied to the completed capacitor coil for approximately ten turns or convolutions. This is long enough to effect a fusing of the Mylar sheets of wrap together to create a good seal. It is released from contact with the now-sealed capacitor by a heat-seal solenoid 97 under the control of the timer 61. This heat-sealing operation completes or finishes the cycle of manufacture of the capacitor at the Station B.

Figure 24:
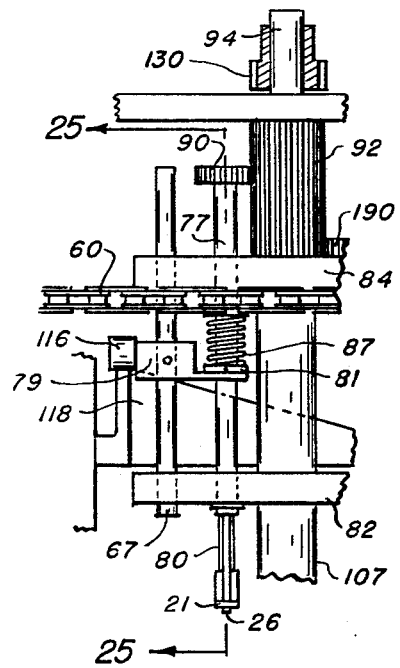
FIG. 24 is a fragmentary view of a part of the machine shown in FIG. 23, but with the parts occupying different positions.
Figure 25:
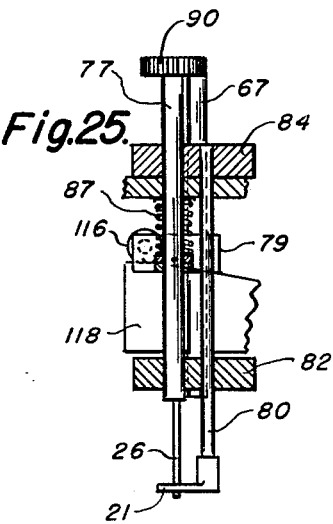
FIG. 25 is a section taken upon the line 25—25 of FIG. 24, looking in the direction of the arrows.

It has already been stated that the two parts 26 and 226 of the two-part arbor 26, 226, at the Station B, are now retracted, in opposite directions away from each other, but of the capacitor, in order to release it. This release is effected, as the turret indexes, by cams 118, 318, FIG. 23. The completed sealed capacitor thereupon falls downward, by gravity, into a receptacle beneath, not shown. To prevent the capacitor from adhering to either of the two parts 26 and 226 of the two-part arbor 26, 226, during their retraction, they are caused to retract through strippers 21 and 221, respectively fixed to rods 80 and 280 of the turret 82 and a duplicate turret 282, shown more particularly in FIGS. 2 and 22 to 25, inclusive. In the right-hand portion of FIG. 23, the supports 180 and 380 for the corresponding strippers 121 and 321 are shown broken, in order not to conceal the supports 177 and 377 for the arbor parts 126 and 326. Coil springs 87 and 287 are designed to project the arbor parts 26 and 226 at the Station A, into the line of feed, into the loading position illustrated by FIGS. 2, 22 and 23. In FIG. 23, for example, the shafts 77 and 277 are shown occupying positions in which the arbor parts 26 and 226 of the two-part arbor 26, 226 are disposed in the line of feed of the superposed sheets 2, 34 and 4. In FIGS. 24 and 25, on the other hand, the shaft 77 is shown occupying a position such that the arbor part 26 is retracted out of this line of feed. The coil spring 87 is shown retracted, with the arbor part 26, therefore, retracted out of the line of feed.

The above-described operation of completing the winding of the coil on the arbor 26, 226, severing it with the cutters 30 and 65, and sealing it has been described as performed at the Station B. During these operations, however, the winding of a new coil has been commenced, at Station A, upon the two-part arbor 126, 326, which has just become transferred from the Station B to the Station A. This two-part arbor 126, 326 is in all respects a duplicate of the two-part arbor 26, 226, it is similarly constructed, and the corresponding parts or elements thereof are similarly operated. The same reference numerals are accordingly applied to these corresponding parts, except that they are augmented by 200.

The before-described operation of capacitor manufacture is now repeated upon the two-part arbor 126, 326 at the first arbor Station A. A threader bar 117 and a cutter 165, positioned diametrically opposite to the threader bar 17 and the cutter 65, respectively, perform functions corresponding to those of the threader bar 17 and the cutter 65, respectively, at the next indexing operation.

Figure 22:
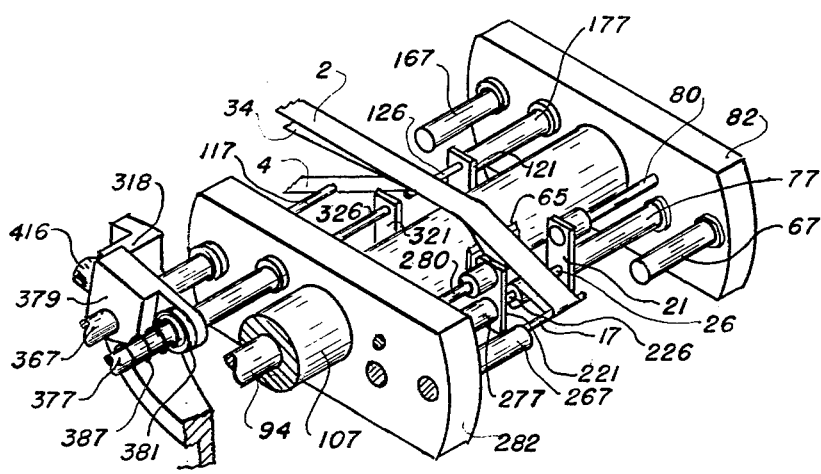
FIG. 22 is an isometric view of a portion of the machine, looking downward, as viewed in FIG. 23.
Figure 23:
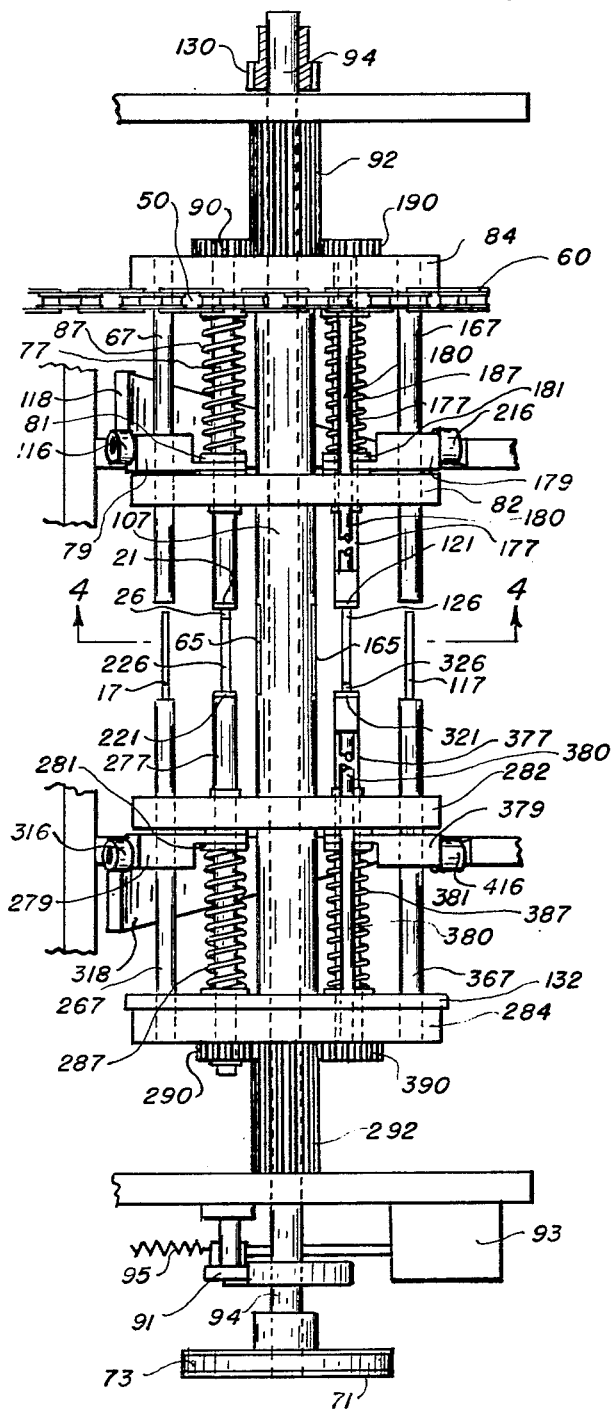
FIG. 23 is a section, taken upon the line 23—23 of FIG. 4, of the right-hand portion of the machine, looking downward, in the direction of the arrows.

The threader bars 17 and 117 are shown in FIGS. 22 and 23 fixed to the turret 282, which is a duplicate of the turret 82. The turrets 82 and 282 are shown, in FIG. 23, at opposite sides of the machine, fixed to the sleeve 107. Two plates 84 and 284 are also fixed to the sleeve 107, respectively disposed outwardly of the turrets 82 and 282. The lower arbor parts 26 and 126, and the upper arbor parts 226 and 326, of the respective two-part arbors 26, 226 and 126, 326, respectively slidably mounted upon the turret 82 and the plate 84 and the turret 282 and the plate 284. The mechanism of this slidable mounting will be described presently.

Figure 3:
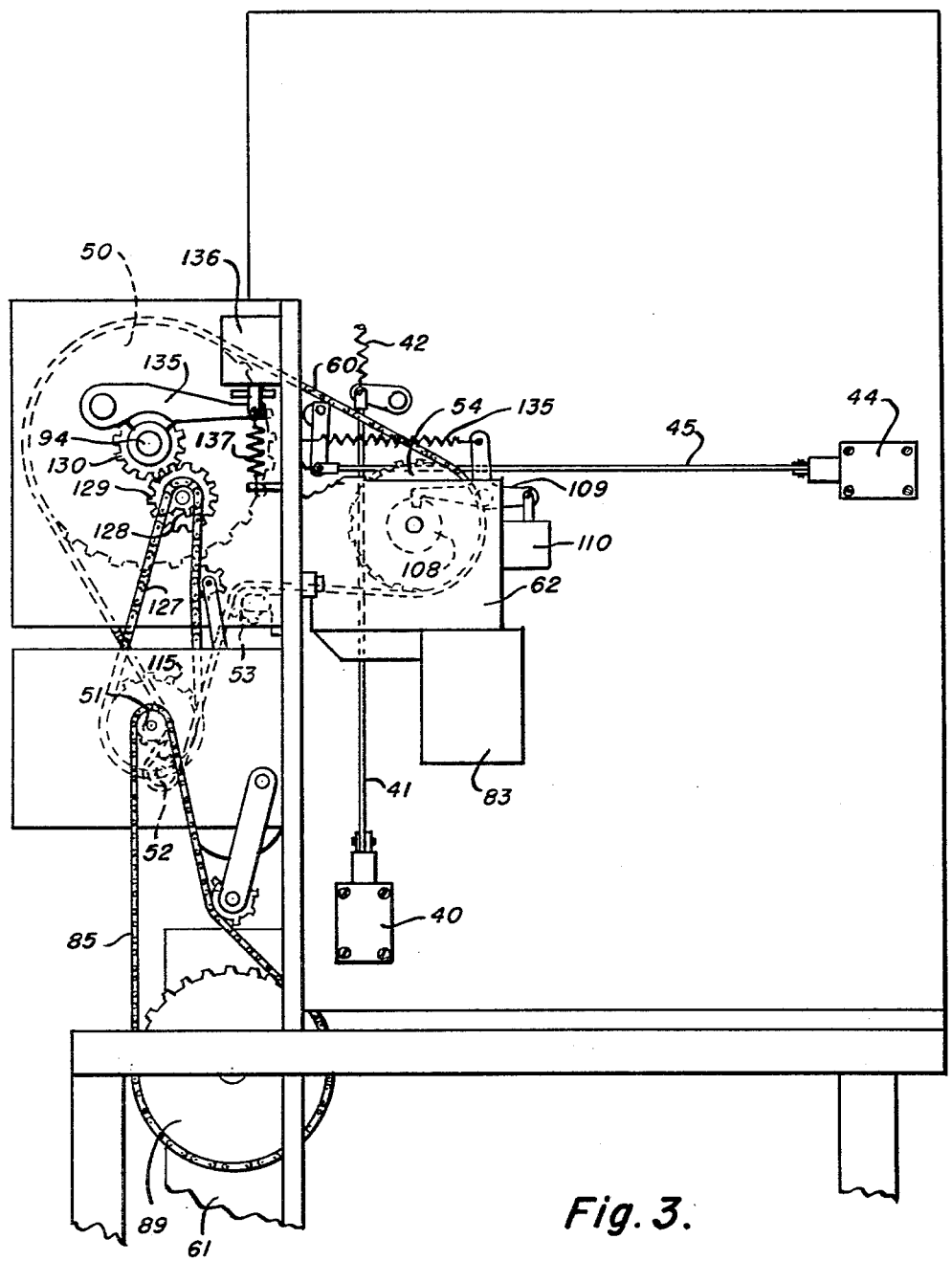
FIG. 3 is a rear elevation of the same.
Figure 27:
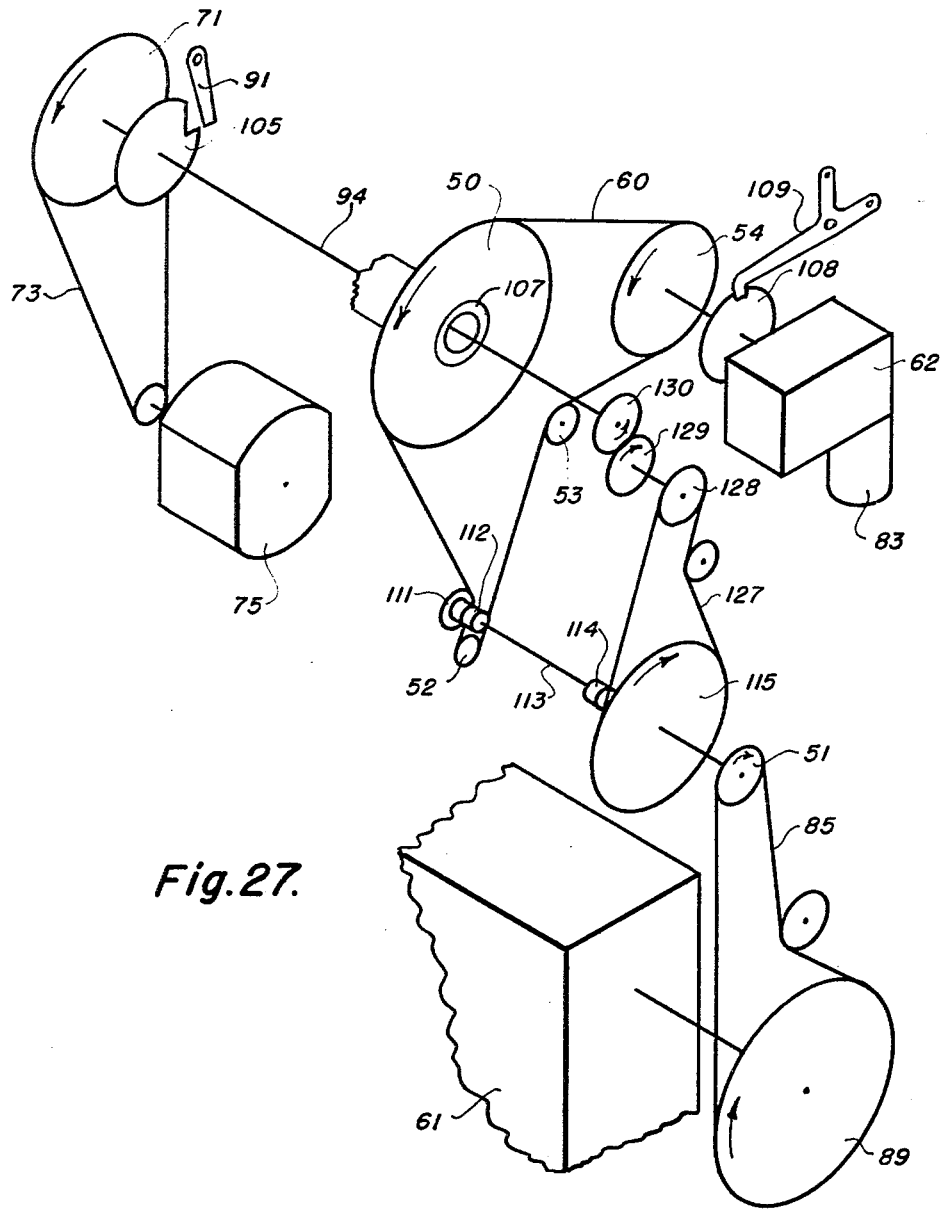
FIG. 27 is a diagrammatic perspective illustrating the driving mechanism and the mechanical connections of the various parts of the machine.
Figure 29:
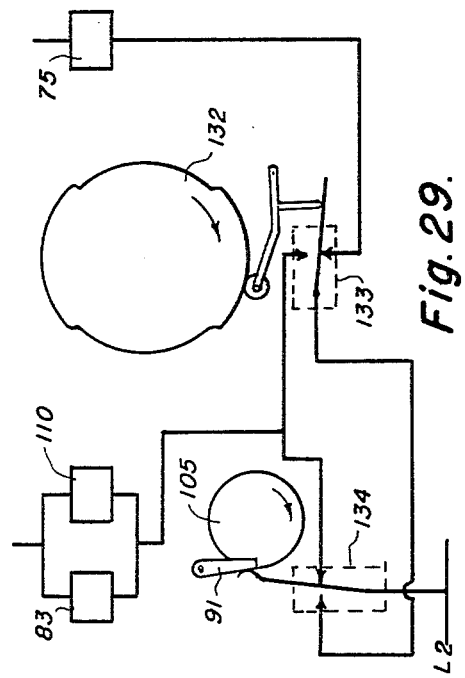
FIGS. 28 to 31, inclusive, show parts of the block diagram, including switch operating means that are not fully disclosed in FIG. 26, and showing parts occupying successive switch positions during the cycle of operation.

Periodically, a turret-index-driven motor 82, FIGS. 3 and 27, which is energized by line voltage, in response to the operation of the arbor latch switch 134, FIGS. 29 and 2, effects a semi-revolution indexing operation of the sleeve 107 about the arbor drive shaft 94. The motor 83 effects this result through the medium of gearing in a gear box 62, operating upon a chain 60, through a sprocket 54, that drives a turret-control sprocket wheel 50 that is fixed to the sleeve 107.

It is this indexing operation that effects the interchange of position of the two-part arbors 26, 226 and 126, 326 between the Stations A and B. The construction by which this interchange is effected will now be described. It will suffice to describe the mechanism for actuating the arbor parts 26 and 226 only, it being borne in mind that the mechanisms for operating the corresponding arbor parts 126 and 326 are substantial duplicates thereof. For this reason, the duplicate parts will be designed by the same reference numerals as those representing the corresponding parts that are described in connection with the arbor parts 26 and 226, but augmented by 200.

The lower part arbor 26 of the two-part arbor 26, 226, FIG. 23, is fixedly secured to one end of a shaft 77 that is mounted to slide horizontally in bearings of the turret 82 and the plate 84, into and out of the line of feed of the sheets 2, 34 and 4. To the other end of the shaft 77, at the upper or far side of FIG. 23, there is secured a gear 90 that, throughout the slidable movement of the shaft 77, meshes with an elongated gear 92 that is fixed to the arbor drive shaft 94. The lower part 26 of the two-part arbor 26, 226, therefore, rotates so long as the arbor drive shaft 94 rotates.

The upper part 226 of the two-part arbor 26, 226 is similarly fixed secured to one end of a shaft 277 that is alined with the shaft and that is mounted, for a similar reason, to slide in bearings of the turret 282 and the plate 284. To the other end of the shaft 277 there is secured a gear 290 that, throughout the slidable movement of the shaft 277, meshes with an elongated gear 292 that is fixed to the arbor drive shaft 94, symmetrically with respect to the gear 92. The upper part 226 of the two-part arbor 26, 226 also, therefore, like the lower part 26 rotates so long as the arbor drive shaft 94 rotates.

The shafts 77 and 277 serve as guides for the respective lower and upper arbor parts 26 and 226 during their sliding movements into and out of the line of feed of the sheets 2, 34 and 4.

The cam-follower rolls 116 and 316 are shown in FIGS. 2 and 23 to 25 respectively engaging gradually sloping barrel-shaped cams 118 and 318. The cam-follower roll 116 is associated with the lower arbor part 26, and the cam-follower roll 316 with the upper arbor part 226 of the two-part arbor 26, 226. As these cam-follower rolls 116 and 316, the barrel-shaped cams 118 and 318, and the parts associated therewith are duplicates, with a slight difference, the cam-follower roll 116, together with the parts associated therewith and with the lower arbor part 26, will alone be described, and the same reference numerals will be applied to the duplicate parts, but augmented by 200. The slight difference is that the barrel-shaped cam 116, that is associated with the lower arbor part 26, is slightly shorter than the barrel-shaped cam 318 that is associated with the arbor part 226. The reason for this difference will appear hereinafter.

The cam-follower roll 116 is fixedly secured to one end of a stem 67 which is slidably mounted horizontally in bearings of the turret 82 and the plate 84. The stem 67 is shown at the left in FIGS. 23 and 24, since the lower arbor part 26 is represented thereon as occupying Station A. In FIG. 22, representing the lower arbor part 26 as occupying Station B, the stem 67 is shown at the right.

The stem 67 and a further stem 267 serve as guides for the respective cam-follower rolls 116 and 316 during their sliding movements. The purpose of this sliding movement is to permit the cam-follower rolls 116 and 316 to slide outwardly, as viewed in FIG. 23, while travelling in engagement with the respective barrel-shaped cams 118 and 318, and inwardly when released from such engagement. As these cam-follower rolls 116 and 316 slide along the respective barrel-shaped cams 118 and 318, along with their respective guide stems 67 and 267, from the low points to the high points of the respective barrel-shaped cams 118 and 318, during the indexing operation between the Stations B and A, they effect the retraction of the respective lower and upper arbor parts 26 and 126, and 226 and 326, of the respective two-part arbors 26, 226 and 126, 326.

In FIGS. 24 and 25, the cam-follower roll 116 is shown occupying a position near the high point of the barrel-shaped cam 118, just prior to its dropping off therefrom. In FIG. 23, the cam-follower rolls 116 and 118 are shown occupying positions just after dropping off those high points. In FIG. 22, the cam-follower roll 416 is shown occupying an intermediate position, in which it is still riding on the barrel-shaped cam 318, and before it has dropped off of the high point thereof.

It will now be assumed that a previous winding cycle has just ended; that a capacitor coil has become completed and sealed on the arbor 26, 226, at the Station B; that the two parts 26 and 226 of the two-part arbor 26, 226 have thereupon become retracted out of the completed, sealed capacitor as a result of the engagement of the cam follower rolls 116 and 316 with the before-described respective barrel-shaped cams 118 and 318, in order to permit the completed capacitor coil to fall, by gravity, into the receptacle beneath, not shown; and that the turrets 82 and 282, as well as the plates 84 and 284, together with the sleeve 107 to which they are fixed, are in the process of performing their half-revolution indexing operation about the arbor drive shaft 94, in order to transport the two-part arbor 126, 326 from the Station A to the Station B, and the two-part arbor 26, 226 from the Station B to the Station A. Particular attention will be paid to what happens, during this half-revolution indexing operation, to the two-part arbor 26, 226.

During this half-revolution indexing operation, the cam-follower rollers 116 and 316 will continue to ride further up the respective barrel-shaped cams 118 and 318, from the low points toward the high points thereof. The cam-follower rolls 116 and 316 are shown pivoted on respective ears 79 and 279 having openings through which respective shafts 77 and 277 extend. These shafts 77 and 27 will be described more fully later. The ears 79 and 279 are shown engaging collars 81 and 281 that are fixed to the respective shafts 77 and 277. Springs 87 and 287 are shown coiled about the respective shafts 77 and 287 between the collar 79 and the plate 84 and between the collar 279 and the plate 284, respectively. As these rolls 116 and 316 travel outward, as viewed in FIG. 23, therefore, they move the respective shafts 77 and 277 outward, in opposition to the forces exerted by the respective coil springs 87 and 287, thus retracting out of the line of feed of the sheets 2, 34 and 4 both the lower and the upper arbor parts 26 and 226 of the two-part arbor 26, 226. During the retraction, as will appear more fully hereinafter, the gears 90 and 290 will remain in meshing engagement with the respective elongated gears 92 and 292.

The cam-follower roll 116 will reach the high point of the barrel-shaped cam 118 at a moment just before the cam-follower roll 316 will reach the high point of the barrel-shaped cam 318. At this moment, the turret 82 occupies the position illustrated by FIG. 5. It and the turret 282, as described above, have not quite completed their half-revolution indexing, and the two-part arbor 26, 226 has not, therefore, quite arrived at the Station A. At the moment, however, when the cam-follower roll 116 drops off the high point of the barrel-shaped cam 118, into the position shown by FIG. 23, the coil spring 87 becomes free to actuate the lower arbor part 26 of the two-part arbor 26, 226 out of its retracted position, at the upper far side of the turret 82, as viewed in FIG. 23, into the loading position, in the line of feed, under the superposed sheets 2, 34 and 4. The superposed metallized sheets 2 and 4, with the insulating Mylar sheet 34 interposed therebetween, become thus deposited upon the lower arbor part 26 of the two-part arbor 26, 226, in the line of feed, as is illustrated by FIGS. 5 and 16.

As the turrets 82 and 282 index further, to complete their half-revolution indexing, into the position illustrated by the turret 82 in FIG. 6, the cam-follower roll 316, having now dropped off the high point of the barrel-shaped cam 318, will permit the coil spring 287 similarly to actuate the upper part arbor 226 of the two-part arbor 26, 226, out of its retracted position, at the near or lower side of the turret 282, as viewed in FIG. 23, into the loading position in the line of feed, over the superposed sheets 2, 34 and 4 resting on the lower part arbor 26, as illustrated by FIGS. 6 and 17. At this time, as illustrated by FIG. 6, the threader bar 17 is positioned under the Mylar sheet 34 and the metallized sheet 2 superposed thereover, and over the metallized sheet 4.

The reason for making the barrel-shaped cam 118 slightly shorter than the barrel-shaped cam 318 now appears. By means of this construction, it becomes possible for the coil springs 87 and 187 to project the lower arbor parts 26 and 126 into the line of feed, or the loading position, as illustrated by FIG. 16, prior to the projection of the corresponding upper part arbors 226 and 326, as illustrated by FIGS. 17, by the respective coil springs 287 and 387.

The operation will now be described for effecting the rotation of the arbors 26, 226 and 126, 326.

In FIG. 23, the elongated gear 92 is shown meshing not only with the gear 90, but also with a gear 190. The gears 90 and 190 are respectively mounted on the above-mentioned shafts 77 and 177 that are parallel to the stems 67 and 167, and upon them are mounted the lower arbor parts 26 and 126 of the respective two-part arbors 26, 226 and 126, 326. Rotation of the shaft 94, therefore, effects rotation of the lower arbor parts 26 and 126, through the gears 92, 90 and 190.

With further reference to FIG. 23, elongated gear 292 is shown meshing not only with the gear 290, but also with gear 390. The gears 290 and 390 are respectively mounted on shafts 277 and 377, upon which are respectively mounted the arbor parts 226 and 326 of the respective two-part arbors 26, 226 and 126, 326. Rotation of the shaft 94, therefore, effects also rotation of the upper arbor parts 226 and 326, through the gears 292, 290 and 390.

By reason of the rotation of the two-part arbors 26, 226 and 126, 326 with the same arbor drive shaft 94, they are caused to become driven in unison.

The two parts 26 and 226 of the two-part arbor 26, 226, and the two parts 126 and 326 of the two-part arbor 126, 326, respectively, therefore, become actuated toward each other, as above described, by slidable movement toward each other of the alined slidable shafts 77, 277, and 177, 377, to which they are respectively secured. During such slidable movement, as before stated, the gears 90 and 190 remain in mesh with the gear 92, and similarly the gears 290 and 390 remain in mesh with the gear 292. The lower part arbors 26 and 126 become actuated into the line of feed, or the loading position, as before stated, before the upper part arbors 126 and 326, to enable the superposed sheets 2, 34 and 4 to become deposited thereon, as illustrated by FIG. 16, before the upper part arbors 226 and 326 become actuated in the line of feed, as illustrated by FIG. 17.

The turret 82 indexes, or rotates through 180 degrees, clockwise, as indicated by the upper curved arrow of FIG. 4. The two-part arbor 26, 226, on the other hand, rotates anticlockwise, opposite to the direction of indexing of the turret 82, as indicated by the lower curved arrow of FIG. 4.

The above-described arrangement of the gears 90, 92, 190 and 290, 292, 390 results in the rotation of each two-part arbor 26, 226 and 126, 326 becoming interrupted during its interchange of positions between the Stations A and B, and its becoming resumed at Station B, after which it is continued until the manufacture of the capacitor coil has become completed.

The turret-indexing semi-revolution having now become completed, the turrets 82 and 282 come to a stop in the position illustrated by the turret 82, in FIG. 6. An arbor motor 75, FIGS. 1 and 27, is now started, at slow speed, by a cam 132, FIG. 1, actuating a turret index switch 133.

The arbor drive shaft 94 is rotated from the arbor motor 75 through the medium of a belt 73, a pulley 71 that is mounted on the shaft 94, and an interposed latch clutch comprising a latch or lock 91 and a cooperating recessed or indented clutch member 105. Periodically, the latch 91 engages in the recess of the cooperating clutch member 105, in order to stop the rotation of the arbor drive shaft 94 at the right point, and thereafter to prevent its further rotation. The latch 91 is engaged, to prevent rotation of the arbor drive shaft 94, by a solenoid 93, FIG. 1, and is disengaged from the recess of the cooperating clutch member 105 by a spring 95.

By reason of the constant intermeshing engagement of the gears 90 and 190 with the elongated gear 92, and of the constant intermeshing engagement of the gears 290 and 390 with the elongated gear 292, the two arbor parts 26 and 226 of the two-part arbor 26, 226 and the two parts 126 and 326 of the two-part arbor 126, 326 are continuously rotating so long as the arbor drive shaft 94 is rotating.

Figure 26:
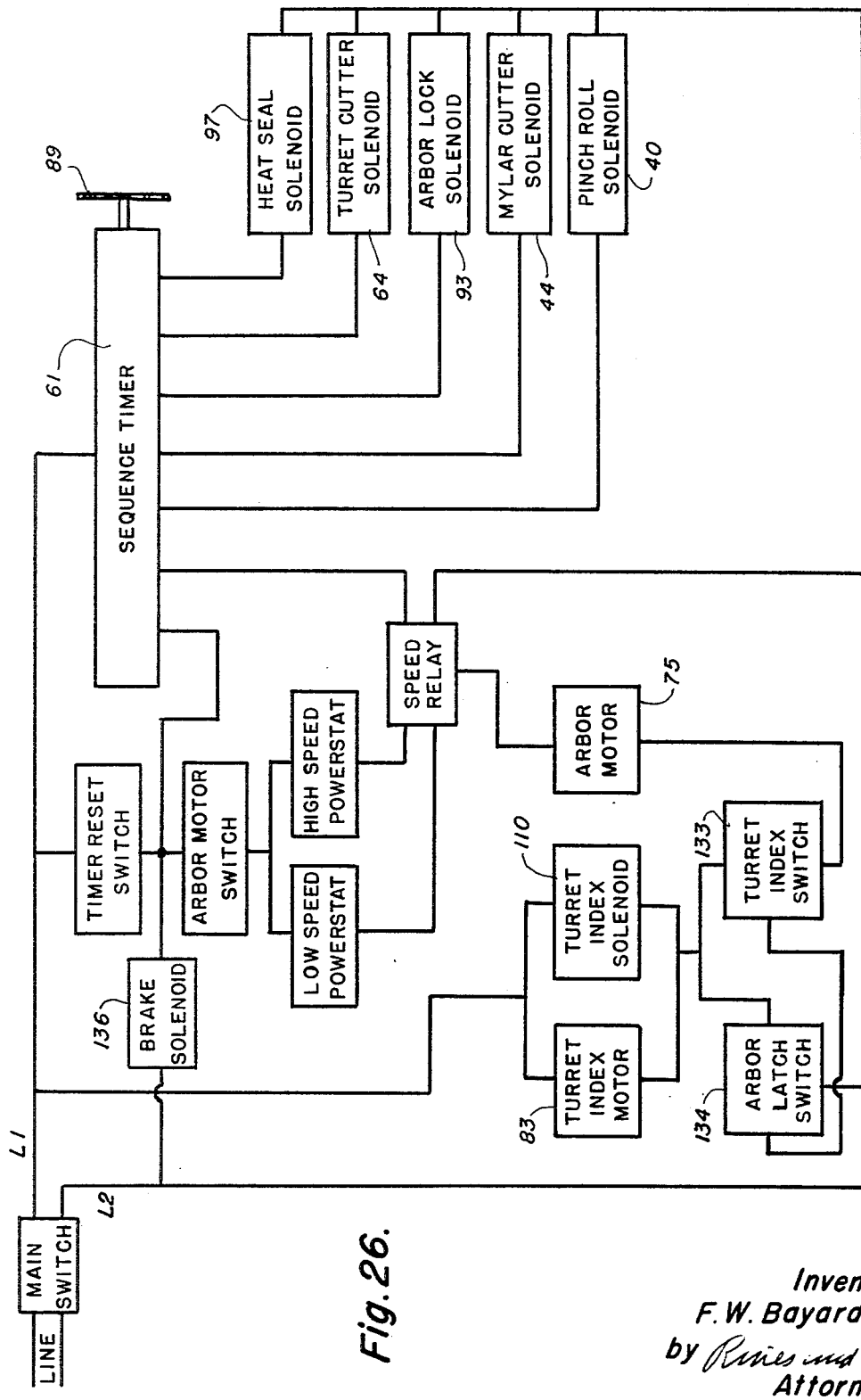
FIG. 26 is a block diagram of the electrical controls from the machine.

The sequence timer 61 is shown in FIG. 26 driven through the sprocket 89, shown also in FIGS. 1 and 27. As this timer 61 goes through a cycle, various circuits are closed and opened, as required, the switch for each circuit having previously been manually adjusted from operating time.

Figure 28:
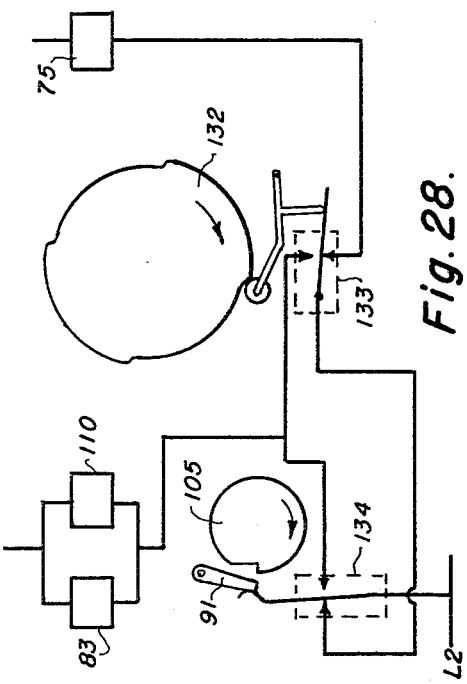

The sequence of operations, without describing the winding procedure in detail, is as follows:

When the MAIN SWITCH indicated in FIG. 26 is closed, a brake solenoid 136 becomes energized, releasing the brake 135, FIG. 3, on the arbor drive shaft 94. The ARBOR MOTOR SWITCH, shown diagrammatically in FIG. 26, is closed manually, and the arbor motor 75, FIGS. 1, 26 and 27, starts at low speed, through the LOW SPEED POWERSTAT. The circuit becomes completed from the line L1, through the turret index switch 133 and the arbor-latch switch 134, to the line L2, as shown in FIGS. 26 and 28. The arbor motor 75 thereupon starts, operating at low speed.

At the proper time, the SPEED RELAY in FIG. 26 becomes energized by the timer 61, and the arbor motor 75 thereupon becomes switched from the LOW SPEED POWERSTAT to the HIGH SPEED POWERSTAT shown in FIG. 26. Around the end of the winding of the capacitor coil at the Station A, the timer 61 switches the SPEED RELAY off, and the arbor motor 75 becomes again connected through the LOW SPEED POWERSTAT. During the winding cycle, therefore, the operation is first at low speed, then at high, and finally at low speed again.

Figure 31:
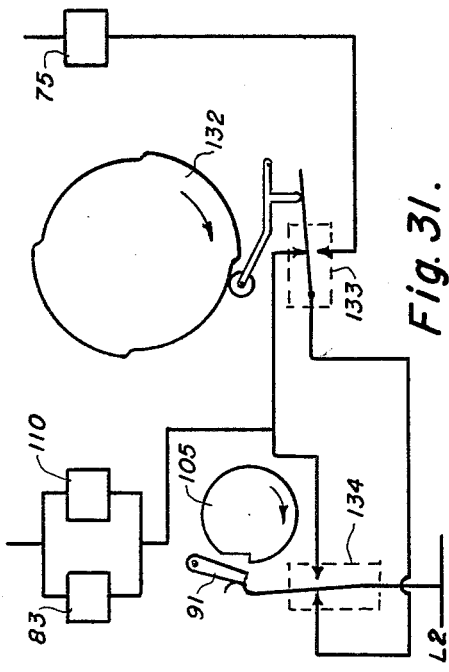
Figure 30:
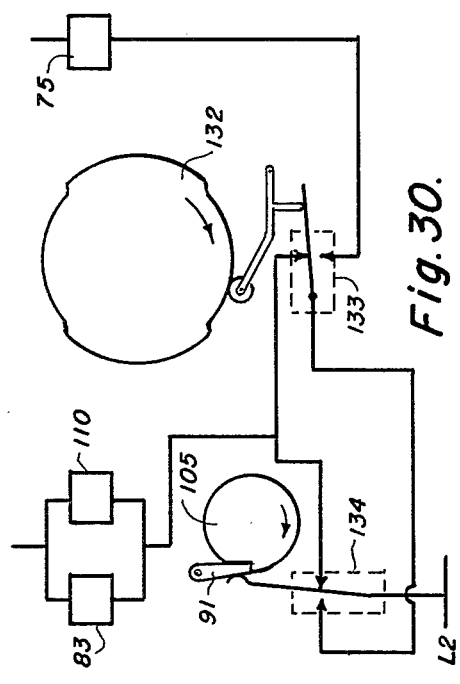

During the winding operation, the various solenoids have become switched on and off by the timer 61, as required. The arbor lock solenoid 93 becomes energized by the timer 61 at the end of the winding and this results in pulling the latch 91 into the recess or indent of the cooperating clutch member 105, FIGS. 1, 27 and 29, effecting the stopping of the arbor drive shaft 94; and, at the same time, the arbor latch switch 134, FIGS. 1 and 29, which energizes hte turret index solenoid 110, becomes actuated by the movement of the latch 91, causing release of the latch 109, FIGS. 3 and 27. Actuation of switch 134, FIG. 29, also opens the circuit of the arbor motor 75. The turret index motor 83 is energized also and this starts the turret indexing, as indicated by the position of the turret index cam 132 in FIG. 29. FIG. 30 shows the position of the cam 132 and the switch 133 at a time when the turret has turned approximately 120°, allowing the actuator of switch 133 to ride onto the smaller radius of the cam 132. This closes the turret index motor circuit by way of the turret index switch 133, though the circuit is still closed at the switch 134, and opens the arbor motor circuit by way of this switch. FIG. 30 is the same as FIG. 29, with the exception that the switch 133 has changed position, in preparation for the operation of the switch 134, as shown in FIG. 31. The turret 82 continues to turn but, before it reaches the 180° position, the timer 61 de-energizes the arbor latch solenoid 93, FIG. 1, allowing the spring 95 to disengage the latch; the same time operating the arbor latch switch 134, which transfers the turret index motor circuit through the turret index switch 133, as shown in FIG. 31.

When the turret has turned 180°, as represented by FIG. 28, the cam follower roll of the turret index switch 133 has been operated by the rise on the cam 132. This opens the circuit to the turret index motor 83, FIGS. 3 and 27, and the turret index solenoid 110, FIG. 3, allowing the latch 109 to engage the notch in the disk 108, stopping the turret index drive 83, 62, 54, 60, 50, FIGS. 3 and 27, in the correct position. At the same time, the turret index switch 133 has closed the circuit of the arbor motor 75, and another winding cycle has started.

The TIMER RESET SWITCH shown in FIG. 26 is used to return the machine to the start of the cycle, if desired. Operation of this switch opens the circuit of the arbor drive motor 75, and de-energizes the brake solenoid 136, FIG. 3, allowing the spring 137 to re-apply the brake 135 to the arbor drive shaft 94. A solenoid (not shown) in the timer 61 is also de-energized, causing the timer 61 to be returned to the start of the cycle.

While the turret is locked stationary by the latch 109, and the detent disk 108, FIGS. 3 and 27, the arbor drive shaft 94 is being driven by the arbor drive motor 75, FIGS. 1 and 27, through the belt 73 and the pulley 71. The latch 91 is disengaged from the recess in the cooperating cltuch element 105 at this time. The gear 130 on the shaft 94, FIGS. 3 and 27, drives the gear 129, and the sprocket 128, which is connected to the sprocket 115 by the chain 127. The sprocket 115 drives the intermediately disposed shaft 113 through a one-direction drive clutch 114. This drives the timer 61 through the sprocket 51, the chain 85 and the sprocket 89.

While the arbor drive shaft 94 is stopped and the turret 82 is being indexed, the drive is as follows: The turret index motor 83 and the gear box 62, FIGS. 3 and 27, drive the turret 82 through the sprocket 54, the chain 60 and the sprocket 50. The chain 60 also engages the sprocket 111, FIG. 27, on the intermediately disposed shaft 113, and drives this shaft through a one-direction drive clutch 112 and idler sprockets 52 and 53. This intermediately disposed shaft 113 is connected to the timer 61 through the sprocket 51, the chain 85, and the sprocket 89. This arrangement, therefore, provides two drives for the timer 61. One drive is from the arbor drive motor 75 while it is operating, and the other is from the turret index motor 83 while it is in operation.

In summary, the rotation of the two-part arbor 26, 226, at the Station A, is all that is necessary to set the machine into automatic and continuous operation. The rotation of the arbor 26, 226 will result in the metallized sheets 2 and 4 becoming continuously unrolled from their supply rolls 14 and 16. Just prior to the coil attaining the desired predetermined size, however, at a position at the rear of the Station A, the pinch roll 24 will be actuated downward, by its solenoid 40, to cause the forward or leading end of the unmetallized Mylar sheet 34 to become fed forward to the arbor 26, 226, in between the metalized sheets 2 and 4. The pinch roll 24 will then become raised by its return coil spring 42, and, at the proper time, the Mylar cutter 38 will server the unmetallized Mylar sheet 34. The arbor 26, 226 will then become actuated to the second arbor Station B. At this second arbor Station B, the cutter 30 will severe the metallized sheet 2 and the unmetallized Mylar sheet 34 in contact therewith. The cutter 65 will then sever the lower metallized sheet 4. The capacitor coil at the Station B will thereafter become sealed, as before described, under the control of the heat-seal solenoid 97, after which the two parts 26 and 226 of the arbor 26, 226 will separate to release the completed capacitor as the turret indexes.

A complete cycle of operation may be described as follows:

The cycle may be considered to start when the arbor drive motor 75, FIGS. 1, 26, 27 and 28, is energized by the cam 132, FIGS. 1 and 28, actuating the turret index switch 133, the machine having been in operation.

The two-part arbors 126, 326 and 26, 226, FIG. 14, start to wind at low speed, the turret cutter 30 having severed sheets 34 and 2, by a signal from the timer 61, energizing the solenoid 64, FIG. 4. At this same time, the Mylar cutter solenoid 44, FIG. 4, is energized by the timer 61 operating the cutter 38, FIG. 4, to sever the sheet 34. The rotation of the arbors tightens the sheet 4 over the arbor cutter 65, severing the sheet 4.

On signal from the timer 61, the SPEED RELAY, FIG. 26, switches the arbor motor 75 to the HIGH SPEED POWERSTAT, FIG. 26, and, later, the timer 61 switches the arbor motor 75 back to the LOW SPEED POWERSTAT, FIG. 26. A siganl from the timer 61 to the pinchroller solenoid 40, FIG. 4, results in pulling the pinch roller 24 down onto the driver roller 22. Thereupon the plain unmetallized Mylar sheet 34 becomes driven over the phenolic platform 39, over the threader bar 17, and in between the metallized Mylar sheets 2 and 4, partly wound on the arbor 26, 226 at the Station A. After approximately between a half and a full turn on the arbor 26, 226 at the Station A, of this unmetallized Mylar sheet 34, between the metallized sheet 2 and 4, the timer 61 signals the pinch roll solenoid 40 to release the unmetallized sheet 34 from its engagement by the driven roll 22. After one or two turns of the unmetallized Mylar sheet 34 into the coil on the arbor 26, 226 at the Station A, between the metallized sheets 2 and 4, the timer 61 energizes the arbor latch solenoid 93, FIG. 1, which engages the latch 91 in member 105, stopping the arbor drive shaft 94 and actuating the arbor latch switch 134. This results in opening the circuit of the arbor motor 75, and closing the circuit of the turret index motor 83, FIGS. 1, 3, 27 and 29, to start the indexing, which has been described in detail above.

While the capacitor was being built up on the arbor 26, 226, at the Station A, the previously wound capacitor, which had been indexed to the Station B, was being completed by having the heat seal 63, FIGS. 4 and 21, run on the winding long enough to fuse together the Mylar sheets of wrap. The timer 61 then energized the heat-seal solenoid 97, FIG. 21, which pulled the heat seal 63 away from the now-completed capacitor.

Though the illustrated machine has been described above as employing only two two-part arbors 26, 226 and 126, 326, at only two arbor Stations A and B, it will be understood that additional arbors, at additional stations, could also be embodied in the machine, at which additional stations additional operations, if desired, could be performed.

Modifications will occur to persons skilled in the art, and all such are considered to fall within the spirit and scope of the present invention, as defined in the appended claims.

What is claimed is:

1. A machine for manufacturing a coil capacitor of the type comprising superposed coiled dielectric sheets each metallized with a metal layer on one only of its two surfaces with the metal layer of each sheet disposed adjacent to the unmetallized surface of the other sheet having, in combination, an arbor, means for causing the arbor to engage superposed forward ends of the metallized sheets with the metal layer of one metallized sheet disposed adjacent to the unmetallized surface of the other metallized sheet, means for rotating the arbor to wind around it first the said forward ends and thereafter the next-following parts of the superposed metallized sheets into a coil of predetermined size, means operable prior to the coil attaining the predetermined size for introducing an insulating patch between the superposed metallized sheets, and means for thereafter severing the superposed metallized sheets and the insulating patch between them upon the coil attaining the predetermined size.

2. A machine for manufacturing coil capacitors of the type comprising superposed coiled dielectric sheets each metallized with a metal layer on one only of its two surfaces with the metal layer of each sheet disposed adjacent to the unmetallized surface of the other sheet having, in combination, two arbors adapted interchangeably and successively to occupy first and second arbor positions, means for causing each arbor, at the first arbor position, to engage superposed forward ends of the metallized sheets with the metal layer of one metallized sheet disposed adjacent to the unmetallized surface of the other metallized sheet, means for rotating each arbor at the first arbor position to wind around it first the said forward ends and thereafter the next following parts of the superposed metallized sheet into a coil of predetermined size, means operable prior to the coil attaining the predetermined size for introducing at the first arbor position an insulating patch between the superposed metallized sheets, means for thereupon interchanging the positions of the arbors, and means for severing the superposed metallized sheets and the insulating patch between them at the second arbor position upon the coil at the second arbor position attaining the predetermined size.

3. A machine as defined in claim 2 in which the severing means comprises means for severing one of the metallized sheets and the insulating patch in advance of severing the other metallized sheet in order that one of the metallized sheets may become longer than the other metallized sheet, and means for winding the longer metallized sheet around the wound coil to provide a wrapper for the capacitor and for sealing the wrapper to the wound coil.

4. A machine for manufacturing coil capacitors of the type comprising superposed coiled dielectric sheets each metallized with a metal layer on one only of its two surfaces with the metal layer of each sheet disposed adjacent to the unmetallized surface of the other sheet having, in combination, means for supporting supply rolls for the respective metallized sheets, means for supporting a supply roll for an insulating sheet, two arbors adapted interchangeably and successively to occupy first and second arbor positions, means for leading to each arbor at the first arbor position from their respective supply rolls the forward ends of the metallized sheets in superposed relation with the metal layer of one metallized sheet disposed adjacent to the unmetallized surface of the other metallized sheet, means for rotating each arbor at the first arbor position to wind around it first the said forward ends and thereafter the next-following parts of the superposed metallized sheets into a coil of predetermined size, means operable prior to the coil attaining the predetermined size for introducing at the first arbor position the insulating sheet from its supply roll between the superposed metallized sheets, means operable at a first predetermined point at the rear of the first arbor position for thereupon severing the insulating sheet, means for thereupon interchanging the positions of the arbors, and means operable at a second predetermined point at the rear of the second arbor position for severing the superposed metallized sheets and the insulating sheet between them to provide forward and rear parts thereof at opposite sides of the second predetermined point, thereby to provide insulating patches for the metallized sheets at the rear of the coil the winding of which has become completed on the arbor at the second arbor position and at the front of the next coil that is about to become wound on the arbor at the first arbor position.

5. A machine for manufacturing coil capacitors of the type comprising superposed coiled dielectric sheets each metallized with a metal layer on one only of its two surfaces with the metal layer of each sheet disposed adjacent to the unmetallized layer of the other sheet having, in combination, two two-part arbors adapted interchangeably and successively to occupy first and second arbor positions, the two parts of each arbor being initially separated at the first arbor position, means for causing one of the parts of each two-part arbor, at the first arbor position, at a time when the said two parts thereof are initially separated, to receive superposed the forward ends of the metallized sheets with the metal layer of one metallized sheet disposed adjacent to the unmetallized surface of the other metallized sheet, means for actuating the other of the two parts of each arbor at the first arbor position toward the said one part thereof to engage the said forward ends of the metallized sheets between them, means for rotating each arbor at the first arbor position to wind around it first the said forward ends and thereafter the next-following parts of the superposed metallized sheets into a coil of predetermined size, means operable prior to the coil attaining the predetermined size for introducing at the first arbor position an insulating patch between the superposed metallized sheets, means for thereupon interchanging the positions of the arbors, means for severing the superposed metallized sheets and the insulating patch between them at the second arbor position upon the coil at the second arbor position attaining the predetermined size, means for sealing the coil at the second arbor position, and means for separating the two parts of each arbor at the second arbor position to remove the sealed coil therefrom.

6. A machine for manufacturing a coil capacitor of the type comprising superposed coiled dielectric sheets each metallized with a metal layer on one only of its two surfaces with the metal layer of each sheet disposed adjacent to the unmetallized surface of the other sheet having, in combination, means for superposing the metallized sheets with the metal layer of one of the metallized sheets disposed adjacent to the unmetallized surface of the other metallized sheet, means for introducing an insulating patch between the forward ends only of the metallized sheets, an arbor, means for causing the arbor to engage the superposed forward ends of the metallized sheets with the patch interposed between them, means for rotating the arbor to wind around it first the said forward ends of the metallized sheets with the insulating patch interposed between them and thereafter the next following parts of the superposed metallized sheets without the insulating patch interposed between them into a coil of predetermined size, means operable prior to the coil attaining the predetermined size whereby the introducing means introduces a second insulating patch between the superposed metallized sheets at the rear portion of the coil, and means for severing the superposed metallized sheets at the rear portion of the coil and the second insulating patch between them upon the coil attaining the predetermined size.

7. A machine for manufacturing successively coil capacitors of the type comprising superposed coiled dielectric sheets each metallized with a metal layer of each sheet disposed adjacent to the unmetallized surface of the other sheet having, in combination, means for winding the metallized sheets into successively wound coils of predetermined size with the metal layer of one metallized sheet of each coil disposed adjacent to the unmetallized surface of the other metallized sheet of each coil, means operable prior to one of the coils attaining the predetermined size for introducing an insulating strip between the superposed metallized sheets at the rear of the said one coil and at the front of the next successive coil to be wound, and means for severing the superposed metallized sheets and the insulating strip between them upon the said one coil attaining the predetermined size, thereby to provide insulating patches intermediate the metallized sheets at the rear of the said one coil and at the front of the said next successive coil to be wound.

8. A machine for manufacturing a coil capacitor of the type comprising superposed coiled dielectric sheets each metallized with a metal layer on one only of its two surfaces with the metal layer of each sheet disposed adjacent to the unmetallized surface of the another sheet having, in combination, an arbor, means for winding the superposed metallized sheets around the arbor with the metal layer of one metallized sheet disposed adjacent to the unmetallized surface of the other metallized sheet, means for supporting a strip of insulating material, means operable prior to the coil attaining a predetermined size for feeding the strip from the supporting means intermediate the superposed metallized sheets, and means for severing the superposed metallized sheets and the insulating strip between them to provide an insulating patch between them at the rear of the coil.

9. A machine for manufacturing coil capacitors of the type comprising superposed coiled dielectric sheets each metallized with a metal layer on one only of its two surfaces with the metal layer of each sheet disposed adjacent to the unmetallized surface of the other sheet having, in combination, two arbors adapted interchangeably and successively to occupy first and second arbor positions, means for winding the sheets around each arbor at the first arbor position with the metal layer of one metallized sheet disposed adjacent to the unmetallized surface of the other metallized sheet into a coil of predetermined size, means operable prior to the coil attaining the predetermined size for introducing at the first arbor position an insulating patch between the superposed metallized sheets, means for thereupon interchanging the positions of the arbors, means for severing the superposed metallized sheets and the insulating patch between them at the second arbor position at a time when another coil is being wound on the arbor at the first arbor position.

References Cited

UNITED STATES PATENTS

| | | | |
|---|---|---|---|
| 2,384,983 | 9/1945 | Weiss | 242—56.1 |
| 3,273,816 | 9/1966 | Fanning | 242—56.1 |
| 3,278,130 | 10/1966 | Jannett | 242—56.1 |

STANLEY N. GILBREATH, Primary Examiner

U.S. Cl. X.R.

29—25.41; 317—260